US012434645B2

(12) United States Patent
Benqassmi et al.

(10) Patent No.: US 12,434,645 B2
(45) Date of Patent: *Oct. 7, 2025

(54) COMPUTING SYSTEMS AND METHODS FOR GENERATING USER-SPECIFIC AUTOMATED VEHICLE ACTIONS USING ARTIFICIAL INTELLIGENCE

(71) Applicant: Mercedes-Benz Group AG, Stuttgart (DE)

(72) Inventors: Hassan Benqassmi, Fremont, CA (US); Maja Buhr, Santa Cruz, CA (US); Chris Busenbark, Creedmoor, NC (US); Anusha Joshi, Santa Clara, CA (US); Jason Kamin, Half Moon Bay, CA (US); Mahmoud Khalil, San Jose, CA (US); Isabel Litton, Santa Clara, CA (US); Samina Reddy, Fremont, CA (US)

(73) Assignee: Mercedes-Benz Group AG, Stuttgart (DE)

( * ) Notice: Subject to any disclaimer, the term of this patent is extended or adjusted under 35 U.S.C. 154(b) by 202 days.

This patent is subject to a terminal disclaimer.

(21) Appl. No.: 18/081,318

(22) Filed: Dec. 14, 2022

(65) Prior Publication Data
US 2024/0198937 A1    Jun. 20, 2024

(51) Int. Cl.
*B60R 16/037* (2006.01)
*B60W 10/00* (2006.01)

(52) U.S. Cl.
CPC ............ *B60R 16/037* (2013.01); *B60W 10/00* (2013.01)

(58) Field of Classification Search
CPC ...... B60R 16/037; B60W 10/00; G06N 20/00
(Continued)

(56) References Cited

U.S. PATENT DOCUMENTS 9,159,232 B2   10/2015   Ricci
9,754,501 B2   9/2017    Stenneth
(Continued)

FOREIGN PATENT DOCUMENTS

CN   106828370   7/2019
CN   110606033   12/2019
(Continued)

OTHER PUBLICATIONS

U.S. Appl. No. 18/081,457, filed Dec. 14, 2022, 70 pages.
(Continued)

*Primary Examiner* — Isaac G Smith
(74) *Attorney, Agent, or Firm* — Dority & Manning, P.A.

(57) ABSTRACT

Methods, computing systems, and technology for automated vehicle action generation are presented. For example, a computing system may be configured to receive context data associated with a plurality of user interactions with a vehicle function of a vehicle. The context data may include data indicative of a plurality of user-selected settings for the vehicle function and data indicative of observed conditions associated with the respective user-selected settings. The computing system may be configured to generate, using a machine-learned clustering model, a user-activity cluster for the vehicle function based on the context data. The computing system may be configured to determine an automated vehicle action based on the user-activity cluster. The computing system may output command instructions for the vehicle to implement the automated vehicle action for automatically controlling the vehicle function in accordance with an automated setting based on whether the vehicle detects one or more triggering conditions.

19 Claims, 13 Drawing Sheets

(58) Field of Classification Search
USPC .......................................................... 701/36
See application file for complete search history.

(56) References Cited

U.S. PATENT DOCUMENTS

| | | | |
|---|---|---|---|
| 10,850,693 B1 | 12/2020 | Pertsel et al. | |
| 11,351,941 B1* | 6/2022 | Maney, Jr. | ............ B60N 2/0248 |
| 11,498,500 B1 | 11/2022 | Pertsel et al. | |
| 2003/0125845 A1* | 7/2003 | Carlstedt | ................ G08G 1/161 |
| | | | 701/1 |
| 2008/0306656 A1 | 12/2008 | Baumann et al. | |
| 2012/0296567 A1 | 11/2012 | Breed | |
| 2014/0165159 A1* | 6/2014 | Baade | ..................... H04L 63/08 |
| | | | 726/4 |
| 2016/0047662 A1 | 2/2016 | Ricci | |
| 2016/0149547 A1 | 5/2016 | Rider et al. | |
| 2017/0305437 A1* | 10/2017 | Onorato | ................. G06Q 50/40 |
| 2018/0141562 A1 | 5/2018 | Singbal | |
| 2018/0265095 A1* | 9/2018 | Joe | ......................... B60W 10/30 |
| 2019/0084372 A1 | 3/2019 | Gallagher | |
| 2019/0101985 A1 | 4/2019 | Sajda et al. | |
| 2019/0176837 A1 | 6/2019 | Williams et al. | |
| 2019/0266418 A1 | 8/2019 | Xu et al. | |
| 2020/0101976 A1 | 4/2020 | Cella | |
| 2020/0242421 A1 | 7/2020 | Sobhany | |
| 2020/0386562 A1 | 12/2020 | Cella | |
| 2021/0053418 A1 | 2/2021 | Kale et al. | |
| 2021/0061201 A1 | 3/2021 | Goluguri et al. | |
| 2021/0078382 A1 | 3/2021 | Maeng et al. | |
| 2021/0323444 A1 | 10/2021 | Fields et al. | |
| 2021/0402942 A1 | 12/2021 | Torabi et al. | |
| 2022/0089063 A1 | 3/2022 | Fields et al. | |
| 2022/0194228 A1 | 6/2022 | Salter et al. | |
| 2023/0062004 A1 | 3/2023 | Okamoto | |
| 2023/0077434 A1* | 3/2023 | Penilla | ................... G08G 1/205 |
| | | | 709/217 |
| 2024/0326743 A1 | 10/2024 | Fang et al. | |

FOREIGN PATENT DOCUMENTS

| | | | | |
|---|---|---|---|---|
| CN | 110607970 | | 12/2019 | |
| CN | 111216605 | | 6/2020 | |
| DE | 102018206557 A1 | | 10/2019 | |
| DE | 102019119460 | | 1/2021 | |
| EP | 2369299 | | 8/2013 | |
| EP | 3240714 B1 | | 8/2023 | |
| IN | 201921009938 | | 3/2019 | |
| JP | 2008195102 A | * | 8/2008 | ......... B60H 1/00735 |
| JP | 2010070171 A | * | 4/2010 | |
| WO | WO 2009/088835 A2 | | 7/2009 | |

OTHER PUBLICATIONS

International Search Report and Written Opinion for PCT Application PCT/EP2023/083246, mailed Mar. 27, 2024, 14 pages.
Non-Final Office Action for the U.S. Appl. No. 18/081,457 from the United States Patent and Trademark Office dated Sep. 26, 2024.
International Search Report and Opinion Application PCT/EP2023/082527, mailed Mar. 1, 2024, 12 pages.
Final Office Action for the U.S. Appl. No. 18/081,457 from the United States Patent and Trademark Office dated May 7, 2025.

* cited by examiner

900A

| ACTION ID | NAME | VEHICLE FUNCTION | TRIGGERING CONDITIONS | AUTOMATED SETTING |
|---|---|---|---|---|
| ID12345 | PMSeatVentAction | SEAT VENTILATION | WITHIN X m of lat/long BETWEEN 12:56-13:19 PM EXTERIOR TEMP > 24°C | LEVEL 3 |
| ID67890 | PMSeatMassageAction | SEAT MASSAGE | @ WORK 13:06-13:17 PM EXTERIOR TEMP ~ 24°C | CLASSIC |
| ID09876 | PMWindowOpenAction | DRIVER WINDOW | WITHIN X m of lat/long 13:05-13:21 PM EXTERIOR TEMP > 23°C | OPEN |
| ... | ... | ... | ... | ... |

USER PROFILE 1

| ACTION ID | NAME | VEHICLE FUNCTION | TRIGGERING CONDITIONS | AUTOMATED SETTING |
|---|---|---|---|---|
| ID54321 | PMSeatMassageAction | SEAT MASSAGE | WITHIN X m of lat/long BETWEEN 9:56-10:43 PM EXTERIOR TEMP 10 - 24°C | GENTLE |
| ID90911 | PMSeatVentAction | SEAT VENTILATION | @ WORK 12:56-13:21 PM EXTERIOR TEMP > 20°C | LEVEL 1 |
| ID91277 | PMWindowAction | SUNROOF | WITHIN X m of lat/long 13:15-13:45 PM EXTERIOR TEMP > 18°C | OPEN |
| ... | ... | ... | ... | ... |

USER PROFILE 2

FIG. 9B

COMPUTING SYSTEMS AND METHODS FOR GENERATING USER-SPECIFIC AUTOMATED VEHICLE ACTIONS USING ARTIFICIAL INTELLIGENCE

FIELD

The present disclosure relates generally to using artificial intelligence, including machine-learned models, for generating vehicle actions that are to be automatically executed by a vehicle and are specifically tailored to a user of the vehicle.

BACKGROUND

Vehicles, such as automobiles, have onboard control systems that operate certain features of a vehicle in response to input from an operator of the vehicle. This includes control features such as braking, acceleration, and steering, as well as comfort-related features such as air conditioning and seating position. The operator may physically manipulate a device or touchscreen element to control these features as the operator sees fit.

SUMMARY

Aspects and advantages of implementations of the present disclosure will be set forth in part in the following description, or may be learned from the description, or may be learned through practice of the implementations.

One example aspect of the present disclosure is directed to a computing system including a control circuit. The control circuit may be configured to receive context data associated with a plurality of user interactions with a vehicle function of a vehicle over a plurality of instances in time. The context data may include data indicative of a plurality of user-selected settings for the vehicle function and data indicative of one or more observed conditions associated with the respective user-selected settings. The control circuit may be configured to generate, using a machine-learned clustering model, a user-activity cluster for the vehicle function based on the context data. The machine-learned clustering model may be configured to identify the user-activity cluster based on at least a portion of the user-selected settings and at least a portion of the one or more observed conditions associated with the respective user-selected settings. The control circuit may be configured to determine an automated vehicle action based on the user-activity cluster. The automated vehicle action may be indicative of an automated setting for the vehicle function and one or more triggering conditions for automatically implementing the automated setting. The control circuit may output command instructions for the vehicle to implement the automated vehicle action for automatically controlling the vehicle function in accordance with the automated setting based on whether the vehicle detects the one or more triggering conditions.

In an embodiment, the machine-learned clustering model may be an unsupervised learning model configured to process the context data using probabilistic clustering to generate the user-activity cluster.

In an embodiment, the machine-learned clustering model may be configured to determine the boundaries of the user-activity cluster for the vehicle function based on the one or more observed conditions.

In an embodiment, to determine the automated vehicle action, the control circuit may be configured to process the user-activity cluster using a vehicle action model, wherein the vehicle action model is a rules-based model configured to apply a respective weight to each of the respective user-selected settings within the user-activity cluster. The control circuit may be configured to determine the automated setting for the vehicle function, based on the weights of the respective user-selected settings within the user-activity cluster.

In an embodiment, to receive the context data, the control circuit may be further configured to receive, via a plurality of sensors or systems of the vehicle, data indicative of the one or more observed conditions. The observed conditions may include at least one of: (i) a day and/or a time of day at which the respective user interaction with the vehicle function occurred, (ii) a location at which the respective user interaction with the vehicle function occurred, (iii) a route during which the respective user interaction with the vehicle function occurred, or (iv) a temperature when the respective user interaction with the vehicle function occurred.

In an embodiment, the control circuit is further configured to generate, based on the automated vehicle action and using an action explanation model, content for presentation to a user via a user interface of a display device. The content indicates the vehicle function, the automated setting, and the one or more triggering conditions.

In an embodiment, the content may include a request for the user to approve the automated vehicle action.

In an embodiment, the control circuit may be further configured to store the command instructions in an accessible memory on the vehicle for execution at a subsequent time.

In an embodiment, the control circuit may be further configured to detect an occurrence of the one or more triggering conditions and based on the one or more triggering conditions, transmit a signal to implement the automated setting for the vehicle function.

In an embodiment, the control circuit may be further configured to determine whether a conflict between the automated vehicle action and a pre-existing automated vehicle action exists or does not exist.

In an embodiment, the control circuit may be further configured to transmit, over a network to a server system, a communication indicative of the command instructions for storage in association with a user profile of a user.

In an embodiment, the plurality of user interactions may be associated with a first user. The command instructions for the automated vehicle action may be associated with a first user profile of the first user. The control circuit may be further configured to receive data indicative of a second user profile of a second user of the vehicle; and store, in an accessible memory of the vehicle, command instructions for a second automated vehicle action associated with the second user profile. The command instructions for the second automated vehicle action may be based on at least one user interaction of the second user with a vehicle function of another vehicle.

In an embodiment, the vehicle may include a plurality of vehicle functions and a plurality of machine-learned clustering models. The control circuit may be further configured to select the machine-learned clustering model from among the plurality of machine-learned clustering models based on the vehicle function.

In an embodiment, the vehicle function may include: (i) a window function, (ii) a seat function, or (iii) a temperature function.

In an embodiment, the seat function may include: a seat temperature function, a seat ventilation function, or a seat massage function.

In an embodiment, the plurality of user-selected settings of the vehicle function may respectively include at least one of: (i) an on/off selection, (ii) an open/close selection, (iii) a temperature selection, or (iv) a massage level selection.

Another example aspect of the present disclosure is directed to a computer-implemented method. The computer-implemented method may include receiving context data associated with a plurality of user interactions with a vehicle function of a vehicle over a plurality of instances in time. The context data may include data indicative of a plurality of user-selected settings for the vehicle function and data indicative of one or more observed conditions associated with the respective user-selected settings. The computer-implemented method may include generating, using a machine-learned clustering model, a user-activity cluster for the vehicle function based on the context data. The machine-learned clustering model may be configured to identify the user-activity cluster based on at least a portion of the user-selected settings and at least a portion of the one or more observed conditions associated with the respective user-selected settings. The computer-implemented method may include determining an automated vehicle action based on the user-activity cluster. The automated vehicle action may be indicative of an automated setting for the vehicle function and one or more triggering conditions for automatically implementing the automated setting. The computer-implemented method may include outputting command instructions for the vehicle to implement the automated vehicle action for automatically controlling the vehicle function in accordance with the automated setting based on whether the vehicle detects the one or more triggering conditions.

In an embodiment, the machine-learned clustering model may include an unsupervised learning model configured to process the context data using probabilistic clustering to generate the user-activity cluster, and the boundaries of the user-activity cluster for the vehicle function may be based on the one or more observed conditions.

In an embodiment, the computer-implemented method may further include generating, based on the automated vehicle action and using an action explanation model, content for presentation to a user via a user interface of a display device. The content may indicate the vehicle function, the automated setting, and the one or more triggering conditions.

Yet another example aspect of the present disclosure is directed to one or more non-transitory computer-readable media that store instructions that are executable by a control circuit to perform operations. The control circuit may receive context data associated with a plurality of user interactions with a vehicle function of a vehicle over a plurality of instances in time. The context data may include data indicative of a plurality of user-selected settings for the vehicle function and data indicative of one or more observed conditions associated with the respective user-selected settings. The control circuit may generate, using a machine-learned clustering model, a user-activity cluster for the vehicle function based on the context data. The machine-learned clustering model may be configured to identify the user-activity cluster based on at least a portion of the user-selected settings and at least a portion of the one or more observed conditions associated with the respective user-selected settings. The control circuit may determine an automated vehicle action based on the user-activity cluster. The automated vehicle action may be indicative of an automated setting for the vehicle function and one or more triggering conditions for automatically implementing the automated setting. The control circuit may output command instructions for the vehicle to implement the automated vehicle action for automatically controlling the vehicle function in accordance with the automated setting based on whether the vehicle detects the one or more triggering conditions.

Other example aspects of the present disclosure are directed to other systems, methods, vehicles, apparatuses, tangible non-transitory computer-readable media, and devices for improving the operation of, and computational efficiency associated with, a vehicle.

These and other features, aspects, and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which:

FIGS. 9A-B illustrate example data structures including data associated with automated vehicle actions according to an embodiment hereof.

DETAILED DESCRIPTION

Figure 1:
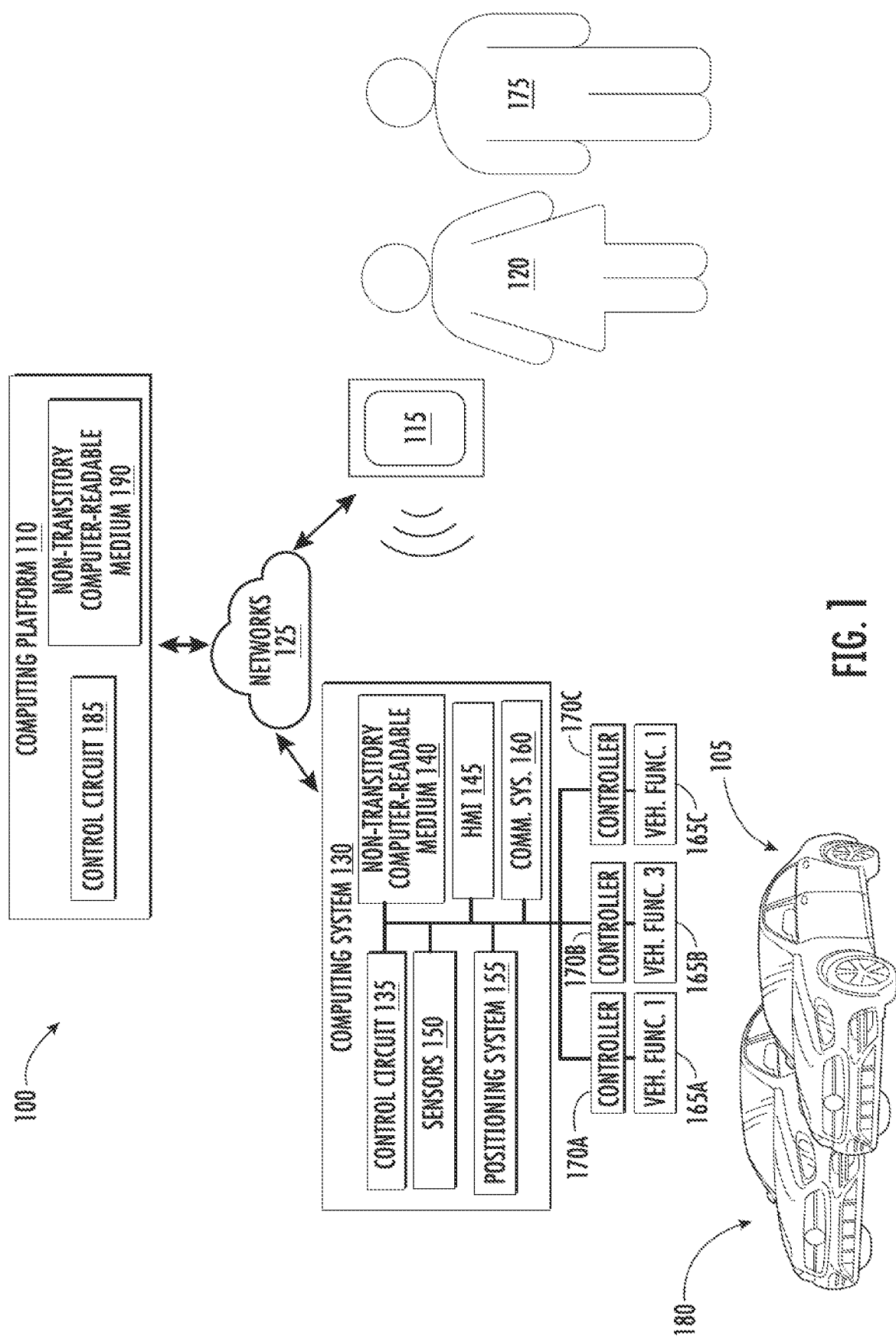
FIG. 1 illustrates an example computing ecosystem according to an embodiment hereof.

An aspect of the present disclosure relates to using personalized artificial intelligence to analyze a user's interactions with a vehicle and generate actions that are to be automatically performed by the vehicle for the specific user. The personalized artificial intelligence that allows a vehicle to emulate a user's behavior can be based on machine-learned models that learn user preferences over time. For instance, a vehicle (e.g., an automobile) may include a plurality of vehicle functions. A vehicle function may refer to a functionality or operation that the vehicle is configured to perform based on input. For example, a user may interact with a vehicle function (e.g., activating or adjusting the vehicle function). The user may be the driver of the vehicle. The vehicle may observe the user's interactions and build a set of context data that reflects the user's preferences with the vehicle function over time. Based on the context data, the vehicle may create automated vehicle actions that anticipate the user's preferences and automatically implement the vehicle functionality as the user prefers.

For example, a user may interact with a seat massage function. The user may activate a massage device in a seat and/or to select a massage setting. The vehicle's onboard computing system may observe the user's interactions with the seat massage function and record certain information for each interaction as context data. For example, the computing system may record the particular massage setting selected by the user (e.g., "classic massage"). Additionally, the computing system may record the time, temperature, and location conditions observed by the vehicle when the user selects the particular setting. By way of example, for a given user interaction, the vehicle may observe that the user selects the massage setting at 5:05 pm PT on Monday, with an outside temperature of 65 degrees F., while at a certain latitude/longitude pair that corresponds to the user's workplace. The user may interact with the seat massage function each day of the week. The computing system may observe the user's selected massage settings to build a set context data that reflects the user's preferences for the seat massage function. The vehicle may use the context data to learn the user's preferences for the seat massage function and implement the seat massage function accordingly.

To help better identify the user's routine and automate the user's preferences, the technology of the present disclosure may leverage a multi-stage, multi-model computing framework for processing the context data.

For instance, the computing system may store, or have access to, a plurality of machine-learned clustering models. Each respective machine-learned clustering model may be associated with a particular vehicle function. This may allow a model to better learn and calibrate its hyperparameters to the types of user interactions a user has with a particular vehicle function. For instance, to learn from the user's seat massage function interactions, the computing system may use a machine-learned clustering model that is associated with the seat massage function.

The machine-learned clustering model may be configured to apply cluster modelling techniques to generate a data cluster based on a pattern identified within the user's activity (a "user-activity cluster"). The boundaries of the user-activity cluster may be defined by the machine-learned clustering model based on observed conditions. For example, as will be further described herein, the machine-learned clustering model may identify the existence of a cluster once a threshold number of data points with a common time range (e.g., 5:03-5:53 pm PT), temperature range (e.g., 60-68 degrees F.), and location range (e.g., within 1000 ft. of the user's workplace) are collected. For seat massage function interactions, for example, the user-activity cluster may include a plurality of data points, each associated with a particular user interaction with the seat massage function. The data points may include metadata indicative of the massage setting selected by the user as well as the observed time, temperature, and location conditions that were observed when the setting was selected. A machine-learned clustering model may group the data points into the user-activity cluster based on similarities or other patterns in the metadata to establish a bounded region of parameters associated with the user's preferences for the seat massage function.

The computing system may process the user-activity cluster to determine a skill (also referred to as a routine) for the vehicle that automates the user's preferred setting for a vehicle specific (or non-vehicle specific) function. To do so, the computing system may utilize a vehicle action model. In some implementations, I vehicle action model may be a rules-based model that weighs the various user-selected settings to, for example, determine the setting most frequently selected by the user (e.g., classic massage). The rules-based model may include a set of predefined rules or heuristics that may be processed to achieve objectives (e.g., for applying weights for setting analysis and selection). In some implementations, the vehicle action model may include one or more machine-learned models. The vehicle may implement this setting as an automated setting.

Additionally, the vehicle action model may determine what conditions will trigger the automated setting ("triggering conditions"). In an embodiment, the triggering conditions may be based on, for example, the time, temperature, or location ranges associated with the user-activity cluster. Accordingly, the computing system may generate an "automated vehicle action" that defines a relationship between the automated setting of the vehicle function and the triggering conditions. For example, the relationship may be expressed as an if/then logic statement: if the time is between 5:00 pm PT and 5:35 pm PT, the temperature is between 60 degrees F. and 65 degrees F., and the vehicle is located within 1000 ft. of the user's workplace, then activate the classic massage setting for the seat massage function.

To confirm that the automated vehicle action is appropriate, the computing system may determine whether the new automated vehicle action conflicts with another automated vehicle action. For instance, the computing system may compare the automated setting and the triggering conditions of the new automated vehicle action with a pre-existing automated vehicle action. Based on the comparison, the computing system may confirm that the vehicle can perform both automated vehicle actions, without modifying either of them.

In an embodiment, the computing system may request that a user approve the automated vehicle action before storing it in the vehicle's memory for execution. To do so, the computing system may generate content for presentation to a user via the vehicle's onboard head unit display device. The content may be a prompt that requests the user's approval by selecting an element on a touch screen, providing a verbal confirmation, etc. Upon approval, the computing system may output command instructions for the vehicle to implement the automated vehicle action for automatically controlling the vehicle function (e.g., the seat massage function) in accordance with the automated setting (e.g., classic massage) based on whether the vehicle detects the triggering conditions. A library may store the command instructions to maintain the automated vehicle actions in association with the specific user or the user's profile. As will be described in further detail, a remote cloud server may store the library so that the user's automated vehicle actions may be automatically downloaded to another vehicle that may be operated by the user. In this way, the systems and methods of the present disclosure can automate actions for a user in a manner that is personalized to the user and transferrable across multiple vehicles.

The technology of the present disclosure provides a number of technical effects and improvements to vehicle and computing technology. For instance, a computing system may leverage machine-learned clustering models that are respectively dedicated to the various vehicle functions. The models may be trained and retrained based on data that is specific to the vehicle function as well as a user's interaction with the vehicle function. As a result, a machine-learned clustering model may better learn the routines and patterns of a user with respect to a particular vehicle function. By improving the automatic learning of the user's preferences, for example, the technology of the present disclosure may reduce or replace manual instruction or configuration inputs from the user, which may cause delays in implementing user preferences. In this manner, for example, the technology of the present disclosure may increase responsiveness of the vehicle in implementing vehicle functions (e.g., reduced latency). Furthermore, by improving the automatic learning of the user's preferences, for example, the technology of the present disclosure may reduce or replace manual instruction or configuration inputs from the user that consume processing power and rendering capacity (e.g., capacity for rendering audio communications, graphical communications), thereby helping to preserve such resources for other vehicle operations.

Moreover, the improved machine-learned clustering models may produce more accurate clusters, which leads to automated vehicle actions that are more likely to be accepted by a user. By reducing the likelihood that an action will be rejected by the user, the technology of the present disclosure can help preserve the limited processing, memory, power, and bandwidth resources on the vehicle for more core vehicle operations.

The technology of the present disclosure may improve the computational configurability of a vehicle. More particularly, by utilizing clustering models that are individualized to a particular vehicle function, a cloud-based platform can more readily and more precisely update the vehicle's onboard software (e.g., via software update pushes over a network) to add models, or remove deprecated models, as vehicle functions change. This can help avoid system reboots or lengthy re-configurations, which can be time and resource intensive.

The automated vehicle actions generated by the systems and methods of the present disclosure may also improve the efficiency of the vehicle's onboard computing resources. For instance, automating a vehicle action based on a user's preferred routine can reduce the number of user interactions that a user would otherwise have with a particular vehicle function. By reducing the frequency of user interaction, the vehicle can reduce the amount of processing and memory resources that are spent each time a user manually adjusts a vehicle function. Additionally, this can lead to less wear on the physical interfaces associated with the vehicle functions.

The technology of the present disclosure may also help reduce unnecessary usage of computational resources across multiple vehicles. For example, as further described herein, automated vehicle actions created by a first vehicle may be transferred to a second vehicle (e.g., by a cloud platform that maintains the user's profile). In this way, the second vehicle can avoid using its computational resources to recreate the automated vehicle actions that were already performed by the first vehicle. This can include, for example, avoiding computation tasks such as clustering, algorithmic weighting, user interface generations, etc.

Ultimately, the systems and methods of the present disclosure improve the computational efficiency and configurability of a vehicle while also providing a personalized user experience that can be wirelessly transferred to another vehicle.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations may be made to the embodiments without departing from the scope or spirit of the present disclosure. For instance, features illustrated or described as part of one embodiment may be used with another embodiment to yield a still further embodiment. Thus, it is intended that aspects of the present disclosure cover such modifications and variations.

The technology of the present disclosure may include the collection of data associated with a user in the event that the user expressly authorizes such collection. Such authorization may be provided by the user via explicit user input to a user interface in response to a prompt that expressly requests such authorization. Collected data may be anonymized, pseudonymized, encrypted, noised, securely stored, or otherwise protected. A user may opt out of such data collection at any time.

FIG. 1 illustrates an example computing ecosystem 100 according to an embodiment hereof. The ecosystem 100 may include a vehicle 105, a remote computing platform 110 (also referred to herein as computing platform 110), and a user device 115 associated with a user 120. The user 120 may be a driver of the vehicle. In some implementations, the user 120 may be a passenger of the vehicle. The vehicle 105, the computing platform 110, and the user device 115 may be configured to communicate with one another via one or more networks 125.

The systems/devices of ecosystem 100 may communicate using one or more application programming interfaces (APIs). This may include external facing APIs to communicate data from one system/device to another. The external facing APIs may allow the systems/devices to establish secure communication channels via secure access channels over the networks 125 through any number of methods, such as web-based forms, programmatic access via RESTful APIs, Simple Object Access Protocol (SOAP), remote procedure call (RPC), scripting access, etc.

The computing platform 110 may include a computing system that is remote from the vehicle 105. In an embodiment, the computing platform 110 may include a cloud-based server system. The computing platform 110 may include one or more back-end services for supporting the vehicle 105. The services may include, for example, tele-assist services, navigation/routing services, performance monitoring services, etc. The computing platform 110 may host or otherwise include one or more APIs for communicating data to/from a computing system 130 of the vehicle 105 or the user device 115.

The computing platform 110 may include one or more computing devices. For instance, the computing platform 110 may include a control circuit 185 and a non-transitory computer-readable medium 190 (e.g., memory). The control circuit 185 of the computing platform 110 may be configured to perform the various operations and functions described herein.

In an embodiment, the control circuit 185 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit.

In an embodiment, the control circuit 185 may be programmed by one or more computer-readable or computer-executable instructions stored on the non-transitory computer-readable medium 190.

In an embodiment, the non-transitory computer-readable medium 190 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 190 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick. In some cases, the non-transitory computer-readable medium 190 may store computer-executable instructions or computer-readable instructions, such as instructions to perform the operations and methods described herein.

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 185 to perform one or more functional tasks. The modules and computer-readable/executable instructions may be described as performing various operations or tasks when a control circuit or other hardware component is executing the modules or computer-readable instructions.

The user device 115 may include a computing device owned or otherwise accessible to the user 120. For instance, the user device 115 may include a phone, laptop, tablet, wearable device (e.g., smart watch, smart glasses, headphones), personal digital assistant, gaming system, personal desktop devices, other hand-held devices, or other types of mobile or non-mobile user devices. As further described herein, the user device 115 may include one or more input components such as buttons, a touch screen, a joystick or other cursor control, a stylus, a microphone, a camera or other imaging device, a motion sensor, etc. The user device 115 may include one or more output components such as a display device (e.g., display screen), a speaker, etc. In an embodiment, the user device 115 may include a component such as, for example, a touchscreen, configured to perform input and output functionality to receive user input and present information for the user 120. The user device 115 may execute one or more instructions to run an instance of a software application and present user interfaces associated therewith. The launch of a software application for a respective transportation platform may initiate a user-network session with the computing platform 110.

The networks 125 may be any type of network or combination of networks that allows for communication between devices. In some implementations, the networks 125 may include one or more of a local area network, wide area network, the Internet, secure network, cellular network, mesh network, peer-to-peer communication link or some combination thereof and may include any number of wired or wireless links. Communication over the networks 125 may be accomplished, for instance, via a network interface using any type of protocol, protection scheme, encoding, format, packaging, etc. Communication between the computing system 130 and the user device 115 may be facilitated by near field or short range communication techniques (e.g., Bluetooth low energy protocol, radio frequency signaling, NFC protocol).

The vehicle 105 may be a vehicle that is operable by the user 120. In an embodiment, the vehicle 105 may be an automobile or another type of ground-based vehicle that is manually driven by the user 120. For example, the vehicle 105 may be a Mercedes-Benz® car or van. In some implementations, the vehicle 105 may be an aerial vehicle (e.g., a personal airplane) or a water-based vehicle (e.g., a boat). The vehicle 105 may include operator-assistance functionality such as cruise control, advanced driver assistance systems, etc. In some implementations, the vehicle 105 may be a fully or semi-autonomous vehicle.

The vehicle 105 may include a power train and one or more power sources. The power train may include a motor, e-motor, transmission, driveshaft, axles, differential, e-components, gear, etc. The power sources may include one or more types of power sources. For example, the vehicle 105 may be a fully electric vehicle (EV) that is capable of operating a powertrain of the vehicle 105 (e.g., for propulsion) and the vehicle's onboard functions using electric batteries. In an embodiment, the vehicle 105 may use combustible fuel. In an embodiment, the vehicle 105 may include hybrid power sources such as, for example, a combination of combustible fuel and electricity.

The vehicle 105 may include a vehicle interior. The vehicle interior may include the area inside of the body of the vehicle 105 including, for example, a cabin for users of the vehicle 105. The interior of the vehicle 105 may include seats for the users, a steering mechanism, accelerator interface, braking interface, etc. The interior of the vehicle 105 may include a display device such as a display screen associated with an infotainment system. Such a component may be referred to as a display device of the infotainment system or be considered as a device for implementing an embodiment that includes the use of an infotainment system. For illustrative and example purposes, such a component may be referred to herein as a head unit display device (e.g., positioned in a front/dashboard area of the vehicle interior), a rear unit display device (e.g., positioned in the back passenger area of the vehicle interior), an infotainment head unit or rear unit, or the like.

Figure 6:
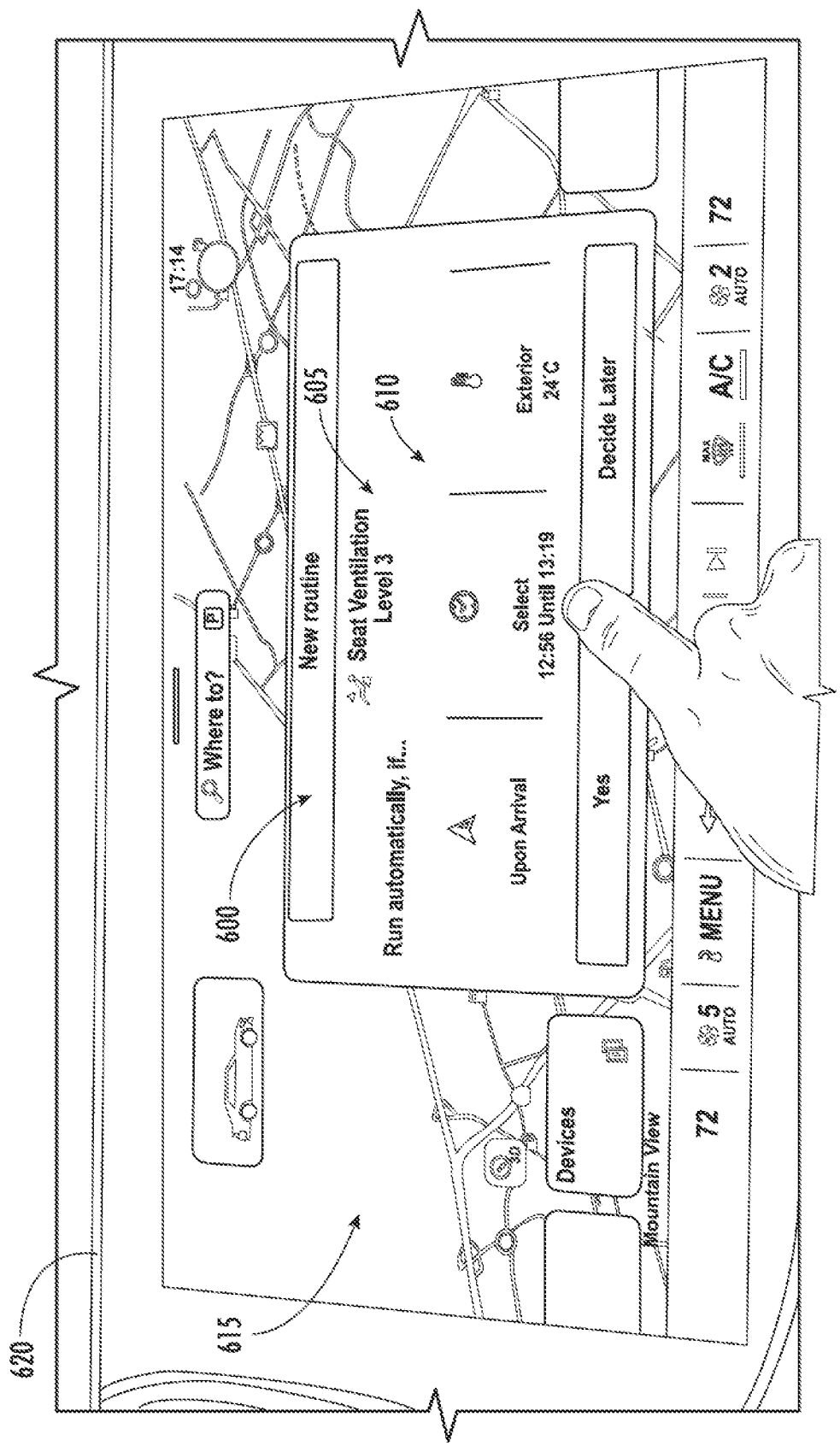
FIG. 6 illustrates a diagram of an example user interface on an example display according to an embodiment hereof.
Figure 7:
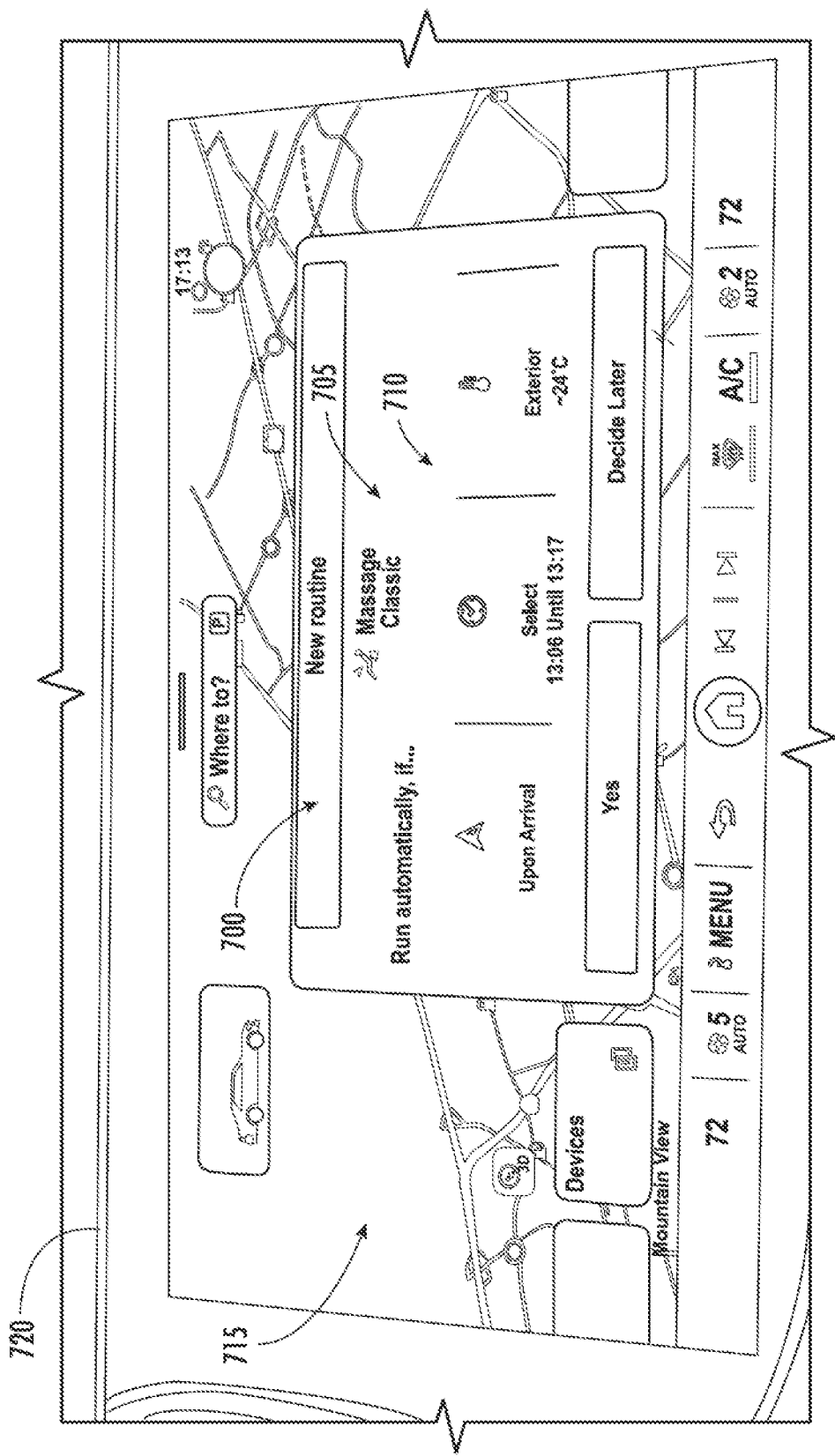
FIG. 7 illustrates a diagram of an example user interface on an example display according to an embodiment hereof.
Figure 8:
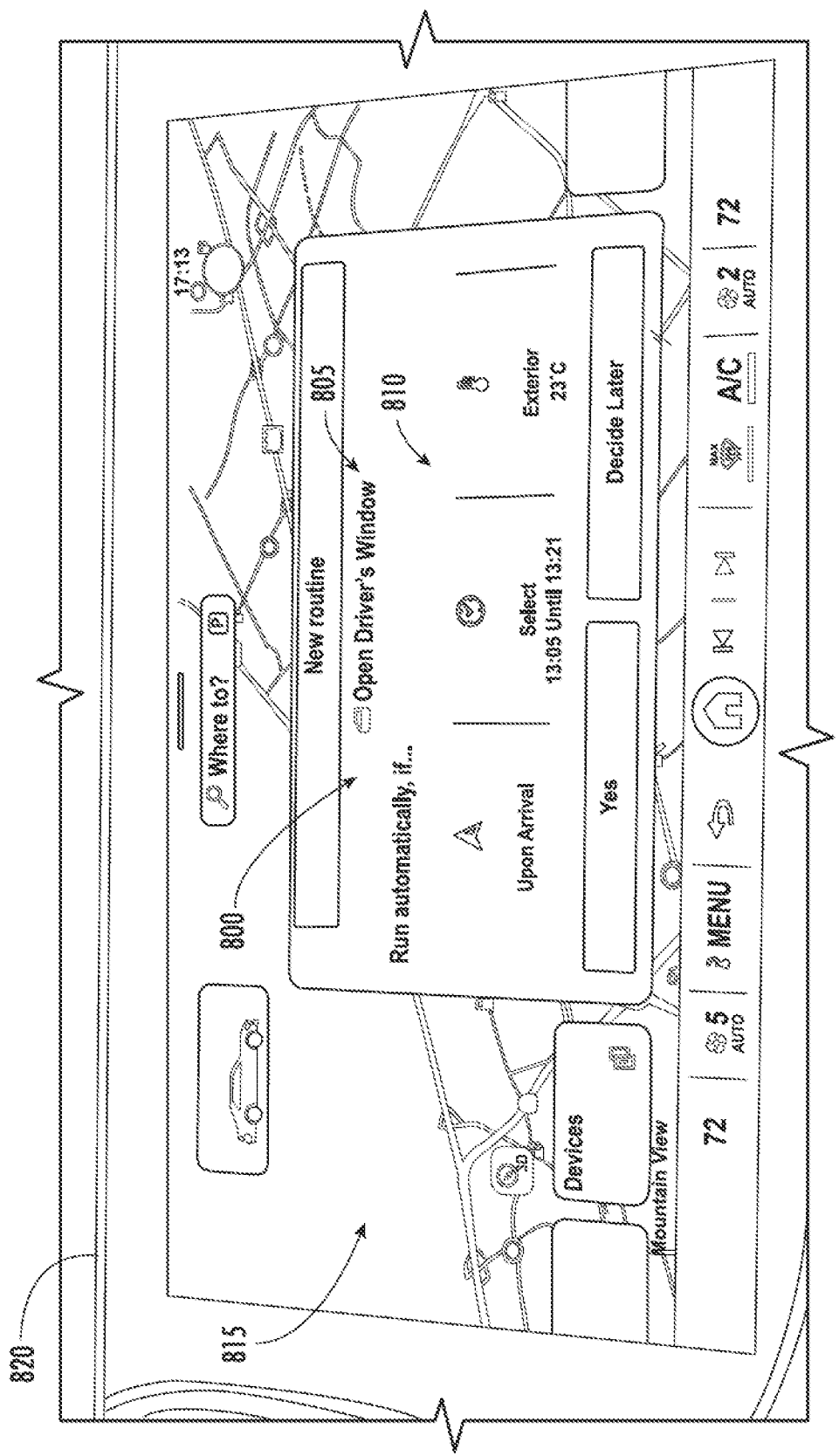
FIG. 8 illustrates a diagram of an example user interface on an example display according to example embodiments hereof.

The display device may display a variety of content to the user 120 including information about the vehicle 105, prompts for user input, etc. The display device may include a touchscreen through which the user 120 may provide user input to a user interface. The display device may be associated with an audio input device (e.g., microphone) for receiving audio input from the user 120. In some implementations, the display device may function as a dashboard of the vehicle 105. An example display device is illustrated in FIGS. 6, 7, and 8.

The interior of the vehicle 105 may include one or more lighting elements. The lighting elements may be configured to emit light at various colors, brightness levels, etc.

The vehicle 105 may include a vehicle exterior. The vehicle exterior may include the outer surface of the vehicle 105. The vehicle exterior may include one or more lighting elements (e.g., headlights, brake lights, accent lights). The vehicle 105 may include one or more doors for accessing the vehicle interior by, for example, manipulating a door handle of the vehicle exterior. The vehicle 105 may include one or more windows, including a windshield, door windows, passenger windows, rear windows, sunroof, etc.

Certain routine and conventional components of vehicle 105 (e.g., an engine) are not illustrated and/or discussed herein for the purpose of brevity. One of ordinary skill in the art will understand the operation of conventional vehicle components in vehicle 105.

The vehicle 105 may include a computing system 130 that is onboard the vehicle 105. The computing system 130 may be located onboard the vehicle 105 in that it is included on or within the vehicle 105. The computing system 130 may include one or more computing devices, which may include various computing hardware components. For instance, the computing system 130 may include a control circuit 135 and a non-transitory computer-readable medium 140 (e.g., memory). The control circuit 135 may be configured to perform the various operations and functions for implementing the technology described herein.

In an embodiment, the control circuit 135 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 135 and/or computing system 130 may be part of, or may form, a vehicle control unit (also referred to as a vehicle controller) that is embedded or otherwise disposed in the vehicle 105 (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior and interior controller (CEIC), a zone controller, or any other controller (the term "or" and "and/or" may be used interchangeably herein).

In an embodiment, the control circuit 135 may be programmed by one or more computer-readable or computer-executable instructions stored on the non-transitory computer-readable medium 140.

In an embodiment, the non-transitory computer-readable medium 140 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 140 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick. In some cases, the non-transitory computer-readable medium 140 may store computer-executable instructions or computer-readable instructions, such as instructions to perform the methods of FIGS. 10A-B and 11. Additionally, or alternatively, similar such instructions may be stored in the computing platform 110 (e.g., the non-transitory computer-readable medium 190) and provided over the networks 125.

The computing system 130 (e.g., the control circuit 135) may be configured to communicate with the other components of the vehicle 105 via a communication channel. The communication channel may include one or more data buses (e.g., controller area network (CAN)), on-board diagnostics connector (e.g., OBD-II), or a combination of wired or wireless communication links. The onboard systems may send or receive data, messages, signals, etc. amongst one another via the communication channel.

In an embodiment, the communication channel may include a direct connection, such as a connection provided via a dedicated wired communication interface, such as a RS-232 interface, a universal serial bus (USB) interface, or via a local computer bus, such as a peripheral component interconnect (PCI) bus. In an embodiment, the communication channel may be provided via a network. The network may be any type or form of network, such as a personal area network (PAN), a local-area network (LAN), e.g., Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the systems/devices of the vehicle 105 may communicate via an intermediate storage device, or more generally an intermediate non-transitory computer-readable medium. For example, the non-transitory computer-readable medium 140, which may be external to the computing system 130, may act as an external buffer or repository for storing information. In such an example, the computing system 130 may retrieve or otherwise receive the information from the non-transitory computer-readable medium 140.

The vehicle 105 may include one or more human-machine interfaces (HMIs) 145. The human-machine interfaces 145 may include a display device, as described herein. The display device (e.g., touchscreen) may be viewable by a user of the vehicle 105 (e.g., user 120, second user 175) that is located in the front of the vehicle 105 (e.g., driver's seat, front passenger seat). Additionally, or alternatively, a display device (e.g., rear unit) may be viewable by a user that is located in the rear of the vehicle 105 (e.g., back passenger seats).

The vehicle 105 may include one or more sensors 150. The sensors 150 may be configured to acquire sensor data. This may include sensor data associated with the surrounding environment of the vehicle 105, sensor data associated with the interior of the vehicle 105, or sensor data associated with a particular vehicle function. The sensor data may be indicated of conditions observed in the interior of the vehicle, exterior of the vehicle, or in the surrounding environment. For instance, the sensor data may acquire image data, inside/outside temperature data, weather data, data indicative of a position of a user/object within the vehicle 105, weight data, motion/gesture data, audio data, or other types of data. The sensors 150 may include one or more: cameras (e.g., visible spectrum cameras, infrared cameras), motion sensors, audio sensors (e.g., microphones), weight sensors (e.g., for a vehicle a seat), temperature sensors, humidity sensors, Light Detection and Ranging (LIDAR) systems, Radio Detection and Ranging (RADAR) systems, or other types of sensors. The vehicle 105 may also include other sensors configured to acquire data associated with the vehicle 105. For example, the vehicle 105 may include inertial measurement units, wheel odometry devices, or other sensors.

The vehicle 105 may include a positioning system 155. The positioning system 155 may be configured to generate position data (also referred to as location data) indicative of a position (also referred to as a location) of the vehicle 105. For example, the positioning system 155 may determine position by using one or more of inertial sensors (e.g., inertial measurement units, etc.), a satellite positioning system, based on IP address, by using triangulation and/or proximity to network access points or other network components (e.g., cellular towers, WiFi access points, etc.), or other suitable techniques. The positioning system 155 may determine a current location of the vehicle 105. The location may be expressed as a set of coordinates (e.g., latitude, longitude), an address, a semantic location (e.g., "at work"), etc.

In an embodiment, the positioning system 155 may be configured to localize the vehicle 105 within its environment. For example, the vehicle 105 may access map data that provides detailed information about the surrounding environment of the vehicle 105. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), or other traffic signals or control devices/markings (e.g., cross walks)); or any other data. The positioning system 155 may localize the vehicle 105 within the environment (e.g., across multiple axes) based on the map data. For example, the positioning system 155 may process sensor data (e.g., LIDAR data, camera data, etc.) to match it to a map of the surrounding environment to get an understanding of the vehicle's position within that environment. The determined position of the vehicle 105 may be used by various systems of the computing system 130 or provided to the computing platform 110.

The vehicle 105 may include a communications system 160 configured to allow the vehicle 105 (and its computing system 130) to communicate with other computing devices. The computing system 130 may use the communications system 160 to communicate with the computing platform 110 or one or more other remote computing devices over a network 125 (e.g., via one or more wireless signal connections). In some implementations, the communications system 160 may allow communication among one or more of the systems on-board the vehicle 105.

In an embodiment, the communications system 160 may be configured to allow the vehicle 105 to communicate with or otherwise receive data from the user device 115. The communications system 160 may utilize various communication technologies such as, for example, Bluetooth low energy protocol, radio frequency signaling, or other short range or near filed communication technologies. The communications system 160 may include any suitable components for interfacing with one or more networks, including, for example, transmitters, receivers, ports, controllers, antennas, or other suitable components that may help facilitate communication.

The vehicle 105 may include a plurality of vehicle functions 165A-C. A vehicle function 165A-C may be a functionality that the vehicle 105 is configured to perform based on a detected input. The vehicle functions 165A-C may include one or more: (i) vehicle comfort functions; (ii) vehicle staging functions; (iii) vehicle climate functions; (vi) vehicle navigation functions; (v) drive style functions; (v) vehicle parking functions; or (vi) vehicle entertainment functions.

The vehicle comfort functions may include a window function (e.g., for a door window, sunroof), a seat function, a wall function, a steering wheel function, a pedal function or other comfort functions. In an embodiment, the seat function may include, for example, a seat temperature function that controls the temperature of the seat. This may include a specific temperature (e.g., in degrees C./F) or a temperature level (e.g., low, medium, high). In an embodiment, the seat function may include a seat ventilation function for controlling the ventilation system of a seat. In an embodiment, the seat function may include a seat massage function for controlling the massager devices within a seat. The seat massage function may have one or more levels, each reflective of the intensity of the massage. In an embodiment, the seat massage function may have one or more programs/settings, each reflective of a different type or combination of massage. In an embodiment, the seat function may include a seat position function for controlling a position of a seat in one or more directions, for example forward/backward or up/down. A pedal function may control a position of one or more pedal controls (e.g., a brake pedal, an accelerator pedal) relative to a user's feet. A wall function may control the temperature of the vehicle interior wall or door. A steering wheel function may control a temperature, position, or vibration of the steering wheel.

The vehicle staging functions may control the interior lighting of the vehicle 105. In an embodiment, the vehicle staging functions may include an interior lighting function. For example, the interior lighting function may control the color, brightness, intensity, etc. of the interior lights of the vehicle 105 (e.g., the ambient lighting). In an embodiment, the vehicle staging functions may include one or more predefined lighting programs or combinations. The programs may be set by the user or pre-programed into the default settings of the vehicle 105. In some implementations, the vehicle staging functions may include an exterior lighting function. For example, the exterior lighting function may control accent lighting under or otherwise located along the exterior of the vehicle 105.

The vehicle climate functions may control the interior climate of the vehicle 105. In an embodiment, the vehicle climate functions may include an air conditioning/heating function for controlling the air conditioning/heating system or other systems associated with setting the temperature within the cabin of the vehicle 105. In an embodiment, the vehicle climate functions may include a defrost or fan function for controlling a level, type, and/or location of air flow within the cabin of vehicle 105. In an embodiment, the vehicle climate functions may include an air fragrance function for controlling a fragrance within the interior of the vehicle 105.

The vehicle navigation functions may control the vehicle's system for providing a route to a particular destination. For example, the vehicle 105 may include an onboard navigation system that provides a route to the user 120 for travelling to a destination. The navigation system may leverage map data and global positioning system (GPS) based signals to provide guidance to the user 120 via a display device within the interior of the vehicle 105.

The vehicle parking functions may control the vehicle's parking-related features. In an embodiment, the vehicle parking function may include a parking camera function that controls a side, rear, or three-hundred-sixty-degree camera to assist a user 120 when parking the vehicle 105. Additionally, or alternatively, the vehicle parking function may include a parking assistance function that helps to maneuver the vehicle 105 into a parking area.

The vehicle entertainment functions may control one or more entertainment-related features of the vehicle 105. For example, the vehicle entertainment functions may include a radio function for controlling a radio or a media function for controlling another source of audio or visual media. The vehicle entertainment functions may control sound parameters (e.g., volume, bass, treble, speaker distribution) or select a radio station or media content type/source.

Each vehicle function may include a controller 170A-C associated with that particular vehicle function 165A-C. The controller 170A-C for a particular vehicle function may include control circuitry configured to operate its associated vehicle function 165A-C. For example, a controller may include circuitry configured to turn the seat heating function on, to turn the seat heating function off, set a particular temperature or temperature level, etc.

In an embodiment, a controller 170A-C for a particular vehicle function may include or otherwise be associated with a sensor that captures data indicative of the vehicle function being turned on or off, a setting of the vehicle function, etc. For example, a sensor may be an audio sensor or a motion sensor. The audio sensor may be a microphone configured to capture audio input from the user 120. For example, the user 120 may provide a voice command to activate the radio function of the vehicle 105 and request a particular station. The motion sensor may be a visual sensor (e.g., camera), infrared, RADAR, etc. configured to capture a gesture input from the user 120. For example, the user 120 may provide a hand gesture motion to adjust a temperature function of the vehicle 105 to lower the temperature of the vehicle interior.

The controllers 170A-C may be configured to send signals to the control circuit 135 or another onboard system. The signals may encode data associated with a respective vehicle function. The encoded data may indicate, for example, a function setting, timing, etc.

The user 120 may interact with a vehicle function 165A-C through user input. The user input may specify a setting of the vehicle function 165A-C selected by the user (a "user-selected setting"). In an embodiment, a vehicle function 165A-C may be associated with a physical interface such as, for example, a button, a knob, a switch, a lever, a touch screen interface element, or other physical mechanism. The physical interface may be physically manipulated to control the vehicle function 165A-C in accordance with the user-selected setting. By way of example, a user 120 may physically manipulate a button associated with a seat massage function to set the seat massage function to a level five massage intensity. In an embodiment, the user 120 may interact with a vehicle function 165A-C via a user interface element presented on a user interface of a display device (e.g., of a head unit infotainment system).

The technology of the present disclosure may utilize artificial intelligence including machine-learned models to learn a routine or pattern of the user 120 interacting with a vehicle function and generate a database of actions for that vehicle function that may be automatically executed by the vehicle 105 for the specific user 120. These automatically executable actions may be referred to as "automated vehicle actions." A user 120 may authorize and activate the computing system 130 to capture data and generate these automated vehicle actions. Such authorization/activation may be provided via user input to a user interface of a display device (e.g., of the infotainment system of the vehicle 105). The technology for generating the automated vehicle actions will now be described in greater detail.

Figure 2:
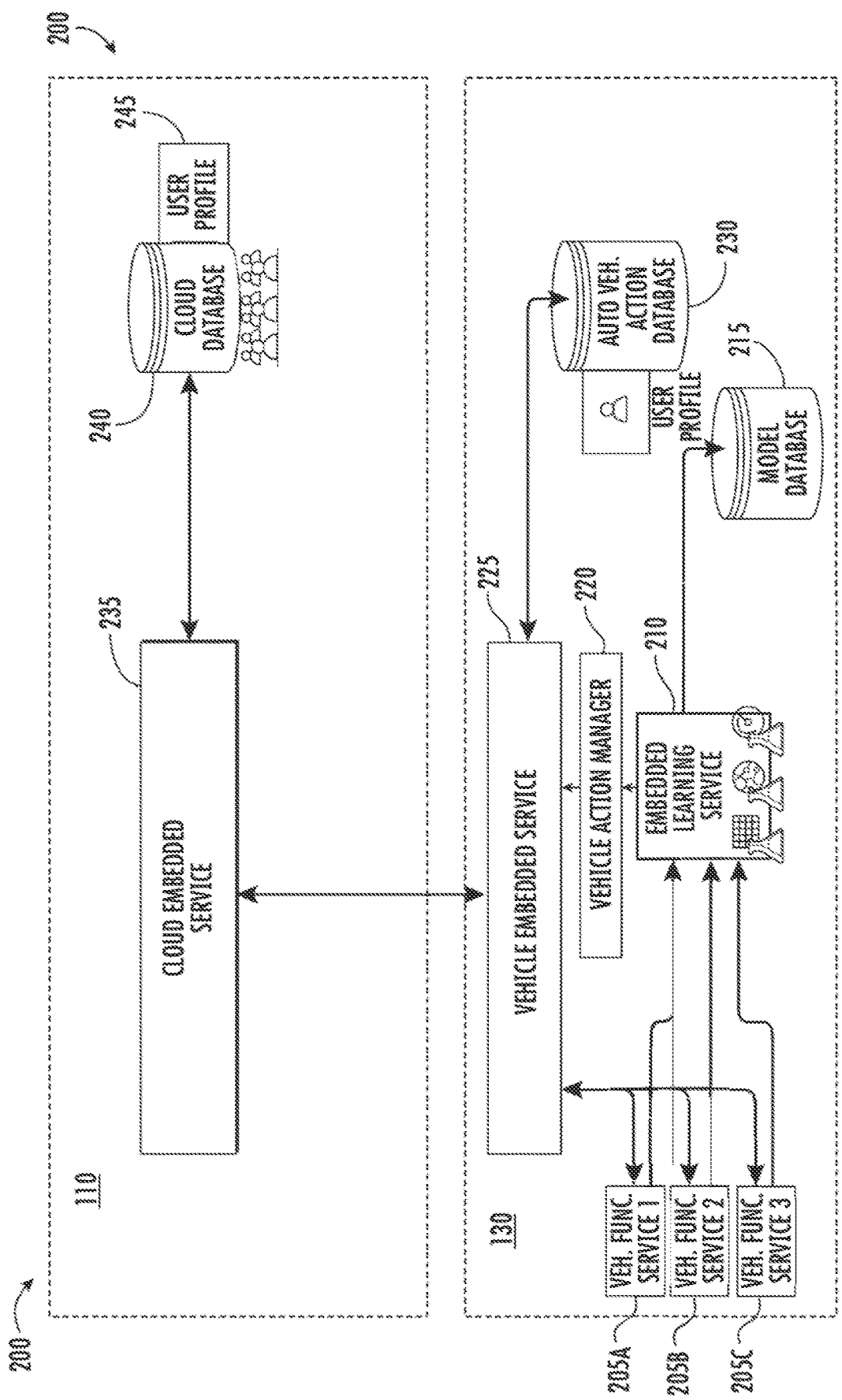
FIG. 2 illustrates a diagram of an example computing architecture according to an embodiment hereof.

FIG. 2 illustrates a diagram of an example computing architecture 200 for generating automated vehicle actions according to an embodiment hereof. The architecture 200 may include: (i) various databases for stored information; (ii) services that perform automated tasks, respond to hardware events, provide data, listen for data requests from other software, etc.; and (iii) software clients. In an embodiment, the services and clients may be implemented as modules within their respective computing systems. For instance, the services and clients may be implemented as modules on the vehicle 105 (e.g., within computing system 130) or remote from the vehicle 105 (e.g., within the computing platform 110).

The computing system 130 may include various services and databases that may be implemented on the vehicle 105 for generating automated vehicle actions based on a learned routine of the user 120. In an embodiment, the computing system 130 may include: vehicle function services 205A-C, an embedded learning service 210, a model database 215, a vehicle action manager 220, a vehicle embedded service 225, and an automated vehicle action database 230.

The vehicle function services 205A-C may be configured to listen for data associated with the vehicle functions 165A-C. In an embodiment, the computing system 130 may include one vehicle function service 205A-C for each vehicle function 165A-C. The vehicle function service 205A-C may listen for context data associated with the respective vehicle function (e.g., via controller 170A-C, associated sensor, etc.). The context data may be indicative of a setting of the vehicle function 165A-C selected by the user 120 ("user-selected setting") and conditions that are observed at the time of the user-selected setting ("observed conditions"). The user-selected setting may include: (i) an on/off selection, (ii) an open/close selection, (iii) a temperature selection, (iv) a function-specific program/setting selection (e.g., a seat massage level selection, a seat heat temperature level selection), or another type of selection. The vehicle function services 205A-C may be configured to communicate the context data to embedded learning service 210 or the vehicle embedded service 225.

The embedded learning service 210 may be configured to learn the routine or pattern of a user's interaction with a particular vehicle function 165A-C and generate an automated vehicle action using one or more models. The embedded learning service 210 may access the models from the model database 215. The model database 215 may store the models, which may be specific to a respective vehicle function of the various vehicle functions 165A-C of the vehicle 105. In an embodiment, the model database 215 may store a data structure that indexes or catalogs the models based on their associated vehicle functions 165A-C. The embedded learning service 210 may access a particular model based on the vehicle function 165A-C indicated in the received context data.

The embedded learning service 210 may include a learning kernel that is continuously training and predicting user routines. These learnings may be formulated into automated vehicle actions and suggested to a user 120. The process/data pipeline by which the embedded learning service 210 analyzes context data to generate the automated vehicle actions will be described in greater detail below with reference to FIG. 3.

With reference still to FIG. 2, the vehicle action manager 220 may be configured to manage automated vehicle actions. In an embodiment, the vehicle action manager 220 may include a service for performing its management responsibilities. The management of automated vehicle actions may include coordinating, for example, the creation and modification of automated vehicle actions, conflict analysis, automated vehicle action persistence, context observation, and automated vehicle action dispatching. The vehicle action manager 220 may be programmed to implement a collection of components and libraries for managing the generation of the automated vehicle actions. In some implementations, the vehicle action manager 220 may include a framework that leverages one or more software factories for returning one or more objects for use by the vehicle action manager 220.

In an embodiment, the vehicle action manager 220 may provide one or more software development kits (SDKs) that help allow a vehicle (e.g., its clients and services) to generate and execute the automated vehicle actions. For instance, the SDKs may include: a standardized object library based on an interface definition, client objects to establish communication to another client or device (e.g., IPC communication to the cloud platform), a client authentication mechanism, standardized logging and metrics (analytics) hooks and tooling, and/or other factors.

In an embodiment, the vehicle action manager 220 may include a client interface to the service of the vehicle action manager 220. For instance, the vehicle action manager 220 may include a client interface that is configured to establish a client connection to the onboard service of the vehicle action manager 220. This may include, for example, establishing a connection to the service using inter-process communication (IPC) such as unix-domain sockets (UDS) or message queueing (mqueue). In an embodiment, the manager client may not utilize client authentication onboard the vehicle 105. For example, a client-service relationship may be established at software build time so that client processes that link to the SDKs may be provided the ability to interact with the service of the vehicle action manager 220.

The vehicle embedded service 225 may be a service for syncing, maintaining, and managing the execution of automated vehicle actions. In an embodiment, the vehicle embedded service 225 may provide an API for various clients and a bridge to the vehicle 105 to extrapolate context data (e.g., as data points) and execute the automated vehicle actions. For instance, the vehicle embedded service 225 may maintain an automated vehicle action database 230. As will be further described herein, the automated vehicle action database 230 may store a data structure that includes command instructions for the automated vehicle actions associated with a specific user 120 or a user profile. In an embodiment, the automated vehicle action database 230 may concurrently store the automated vehicle actions for more than one user (or user profiles). The vehicle embedded service 225 may be configured to receive data from the vehicle function services 205A-C and determine if any triggering conditions for the stored automated vehicle actions exist. The vehicle embedded service 225 may be configured to transmit signals to control a vehicle function 165A-C in accordance with the automated vehicle action in the event the triggering conditions exist, as will be further described herein.

The vehicle embedded service 225 may be configured to synchronize automated vehicle actions with a computing system that is remote from the vehicle 105. For instance, the vehicle embedded service 225 may be configured to transmit data indicative of automated vehicle actions that are generated onboard the vehicle 105 to the computing platform 110 (e.g., a cloud-based server system).

The computing platform 110 may include various services and databases that may be implemented on its servers for supporting the management and generation of automated vehicle actions. In an embodiment, the computing platform 110 may include: a cloud embedded service 235 and a cloud database 240.

The cloud embedded service 235 may be a service for syncing, maintaining, and managing automated vehicle actions in a system that is remote from the vehicle 105. In an embodiment, the cloud embedded service 235 may provide APIs for various clients to manage automated vehicle actions. The possible clients may include, for example, a service running onboard the vehicle 105, a mobile software application (e.g., iOS, Android), or a web application.

In an embodiment, the cloud embedded service 235 may include or otherwise be associated with a cloud manager (offboard the vehicle) configured to perform operations and functions similar to the vehicle action manager 220. For instance, the cloud manager may include a client configured to establish a client connection to a cloud manager service (e.g., a connection to the service using an TCP-based protocol such as HTTP). In some implementations, client authentication may be required to establish a connection. This may include, for example, using a token-based authentication scheme.

The cloud embedded service 235 may be configured to maintain a data structure that identifies the automated vehicle actions for a particular user 120. This may include, for example, receiving data indicative of automated vehicle actions generated onboard a vehicle 105, identifying a particular user profile 245 of the user 120 of the vehicle 105 for which the automated vehicle action was generated, and providing the data indicative of automated vehicle actions for storage in association with the user profile 245 in the cloud database 240. The cloud embedded service 235 may identify a user profile 245 from among a plurality of user profiles based on data provided from the vehicle 105. This may include encrypted pseudonymized data associated with the user 120 (e.g., encrypted user ID), which may be decrypted and used with a look-function to access the appropriate user profile 245. The cloud embedded service 235 may be configured to update the cloud database to include new automated vehicle actions or to remove automated vehicle actions (e.g., when an action is disabled or deleted by the user).

The cloud database 240 may store information for a plurality of users. For instance, the cloud database 240 may store a plurality of data structures that include the automated vehicle actions. A respective data structure may include a table or list of the automated vehicle actions associated with a particular user profile. The table/list may index the automated vehicle actions according to vehicle function 165A-C. The respective data structure may be adjusted to reflect an updated representation of the automated vehicle actions associated with a particular user profile (e.g., when new actions are generated, previous actions removed, etc.).

In an embodiment, the cloud embedded service 235 may be configured to provide data indicative of a user profile and its associated vehicle actions to the vehicle 105. For example, a user 120 may be identified by the vehicle embedded service 225 when the user 120 enters the vehicle (e.g., based on a handshake between the user's key or user device with the vehicle 105, a user profile selection on the head unit display). The user 120 may be different than the last user to operate the vehicle 105. The vehicle embedded service 225 may transmit pseudonymized data indicative of the user and request data indicative of the user profile 245 of the user 120 (and the automated vehicle actions associated therewith). The cloud embedded service 235 may receive this request, access the cloud database 240 to retrieve the requested data, and transmit data indicative of the requested user profile 245 (and the automated vehicle actions associated therewith) to the vehicle embedded service 225. The vehicle embedded service 225 may store the data indicative of the automated vehicle actions associated with the user 120 in the automated vehicle action database 230 (e.g., as an active user of the vehicle 105).

In an embodiment, the vehicle embedded service 225 may request more than one user profile from the cloud embedded service 235. For instance, two users may enter the vehicle 105: a first user 120 as a driver and a second user 175 (shown in FIG. 1) as a passenger. The computing system 130 may detect the presence of the first user based on a handshake between the first user's key (or mobile device) with the vehicle 105 or the first user 120 may provide user input to a display device of the vehicle 105 to select a user profile of the first user. The computing system 130 may detect the presence of the second user 175 based on a handshake between the second user's key (or mobile device) with the vehicle 105 or the second user 175 may provide user input to a display device of the vehicle 105 to select a profile of the second user 175. In response, the computing system 130 may transmit a request to the cloud embedded service 235 for a first user profile of the first user 120 and a second user profile of the second user 175. The cloud embedded service 235 may retrieve data indicative of the first and second user profiles from the cloud database 240 and transmit the profile data to the computing system 130. As will be described herein, the concurrent utilization of multiple user profiles onboard the vehicle 105 may allow for the embedded learning service 210 to learn user routines for two different users at a same (or overlapping) time period.

The cloud embedded service 235 may be configured to track the performance of the models utilized to generate the automated vehicle actions. For instance, the cloud embedded service 235 may be configured to track how often the automated vehicle actions generated by the embedded learning service 210 are rejected by the user 120.

Figure 3:
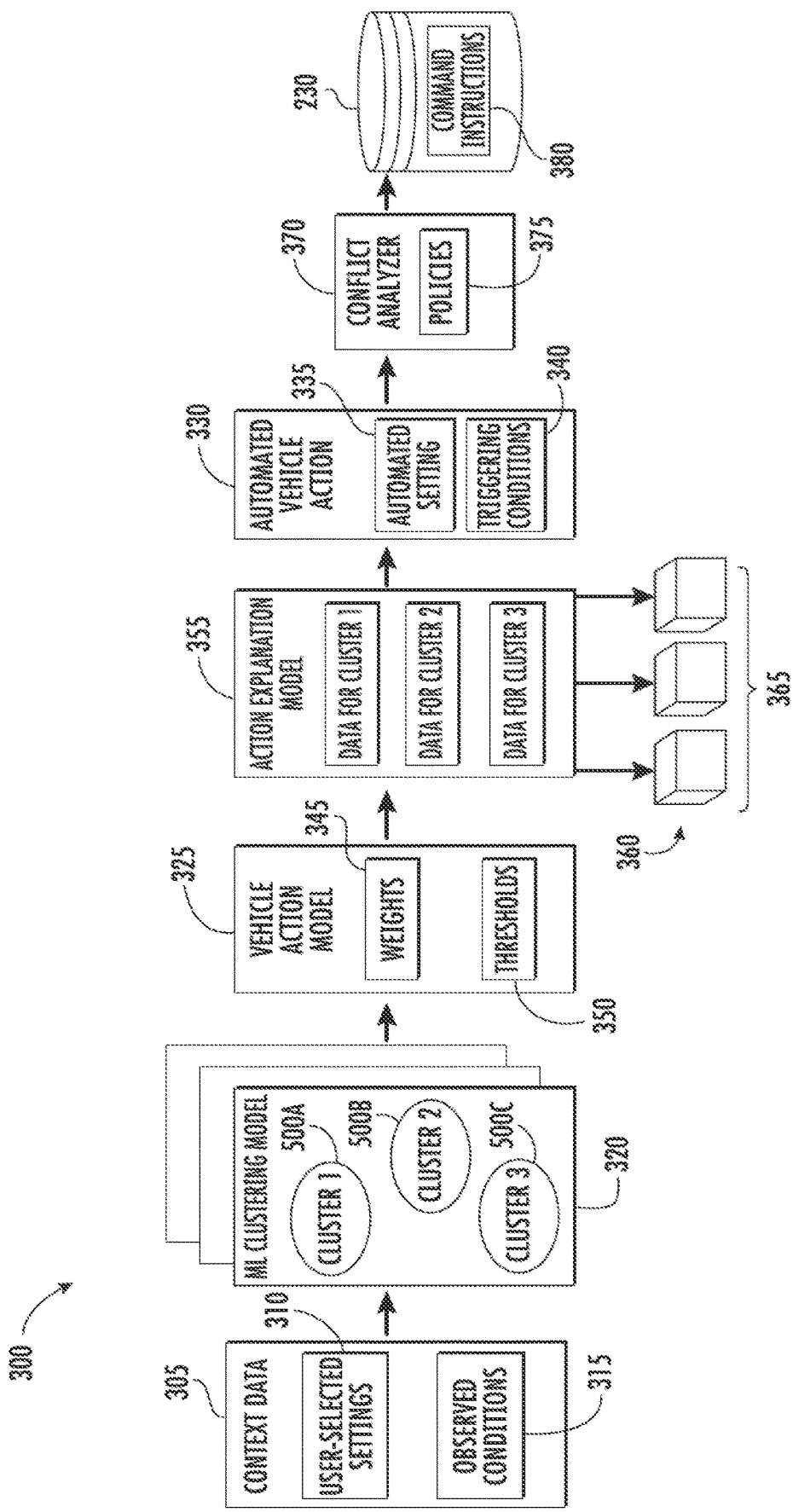
FIG. 3 illustrates a diagram of an example data processing pipeline according to an embodiment hereof.

FIG. 3 illustrates a diagram of an example data pipeline 300 for generating automated vehicle actions using a plurality of models according to an embodiment hereof. The following description of dataflow in data pipeline 300 is described with an example implementation in which the computing system 130 utilizes the plurality of models to generate automated vehicle actions onboard the vehicle 105. Additionally, or alternatively, one or more portions of the dataflow in data pipeline 300 may be implemented in the computing platform 110.

The computing system 130 may receive context data 305 associated with a plurality of user interactions with a vehicle function 165A-C of a vehicle 105 over a plurality of instances in time. The vehicle function service 205A-C associated with the respective vehicle function 165A-C may provide the context data 305. The user interactions may include the user 120 interacting with an interface (e.g., physical button, soft button) of the vehicle function 165A-C to adjust the vehicle function 165A-C according to a user-selected setting 310. This may include turning the vehicle function 165A-C to an "on" state, an "open" state, setting an intensity level, etc.

The context data 305 may be indicative of the plurality of user-selected settings 310 across the plurality of instances in time. Each respective instance in time may be a point in time, a time range, a time-of-day, a stage of day (e.g., morning, midday, afternoon, evening, night), a day of the week, a week, a month, a certain date, etc. A respective instance in time may be indicative of when the user interaction occurred (e.g., when the vehicle function service 205A-C detected the user interaction) or when the context data was transmitted or received by the embedded learning service 210.

The context data 305 may be indicative of one or more observed conditions 315 associated with the user-selected settings 310. The observed conditions 315 may be captured at the instance in time associated with the user interaction. The computing system 130 may receive the data indicative of the observed conditions 315 via the plurality of sensors 150 or systems (e.g., positioning system 155) of the vehicle 105. In an embodiment, the data indicative of the observed conditions 315 may be provided through the associated vehicle function service 205A-C The observed conditions 315 may be indicative of certain conditions occurring when the user 120 interacted with the respective vehicle function 165A-C. For instance, the observed conditions 315 may include at least one of: (i) a day and/or a time of day at which the respective user interaction with the vehicle function 165A-C occurred, (ii) a location at which the respective user interaction with the vehicle function 165A-C occurred, (iii) a route during which the respective user interaction with the vehicle function 165A-C occurred, or (iv) a temperature when the respective user interaction with the vehicle function 165A-C occurred. The route may be one that the user requested via the vehicle's navigation function and the user is following to a destination. In an embodiment, the observed conditions 315 may include other information such as, for example, weather conditions, traffic conditions, etc.

Figure 4:
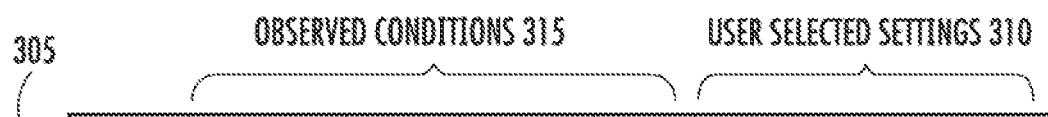
FIG. 4 illustrates a diagram of an example data structure including data associated with user interactions according to an embodiment hereof.

FIG. 4 illustrates example context data 305 associated with a plurality of user interactions with vehicle functions 165A-C of a vehicle 105 over a plurality of instances in time. Each row shown in FIG. 4 can represent a respective user interaction. As shown, each user interaction may be associated with a time (e.g., a day and time) and include a user-selected setting 310 for a vehicle function 165A-C. By way of example, on Monday the user 120 manually sets the seat ventilation to level three, turns on the seat massage function and sets it "classic massage," and opens a driver's side window. These user-selected settings 310 are each recorded with observed conditions 315. As shown in the example, each user-selected setting 310 is associated with an observed day, time, location (e.g., latitude/longitude coordinates), and temperature.

Returning to FIG. 3, the computing system 130 may utilize a machine-learned model to determine whether a routine or pattern exists within the context data 305. For instance, the computing system 130 may utilize a model, such as, a machine-learned clustering model 320. Additionally, or alternatively, the computing system 140 may utilize a rules-based clustering model.

In an embodiment, the machine-learned clustering model 320 may be an unsupervised learning model configured to group input data into multiple clusters such that similar data points are grouped together and dissimilar data points are distinguished. The machine-learned clustering model 320 may process the context data 305 using cluster analysis (e.g., probabilistic clustering) to generate a user-activity cluster 500A-C based on the user interactions with a particular vehicle function 165A-C. Using the machine-learned clustering model 320 may include processing the context data 305 with one or more cluster modelling techniques. This may include the application of one or more of the following to the context data 305: K-means clustering, KNN (k-nearest neighbors), K-medians clustering, expectation maximization models, hierarchal clustering, density-based spatial clustering of applications with noise (DBSCAN), ordering points to identify the clustering structure (OPTICS), anomaly detection, principal component analysis, independent component analysis, apriori algorithm, or other approaches. The machine-learned clustering model 320 may include or otherwise be impacted by a number of hyperparameters, such as, for example, a number of clusters, etc.

The unsupervised learning model may be trained based on training data that does not include labels (or only a small number of labels). The training may include methods such as: Hopfield learning rule, Boltzmann learning rule, Contrastive Divergence, Wake Sleep, Variational Inference, Maximum Likelihood, Maximum A Posteriori, Gibbs Sampling, or backpropagating reconstruction errors or hidden state reparameterizations. The training of the machine-learned clustering model 320 is further described below with reference to FIG. 12.

As described herein, the model database 215 may include a plurality of machine-learned clustering models. Each machined-learned clustering model may be associated with a particular vehicle function 165A-C. By having individual machine-learned clustering models assigned to particular vehicle functions, each machine-learned clustering model may be able to focus its learning on data associated with a single vehicle function, as opposed to trying to learn patterns and identify clusters for a plurality of vehicle functions. This may improve model confidence as well as the accuracy of the clusters generated by the dedicated models.

The computing system 130 may select, invoke, or otherwise implement a machine-learned clustering model 320 from among the plurality of machine-learned clustering models (e.g., stored in the model database 215) based on the one or more vehicle functions 165A-C indicated in the context data 305. For example, given the example context data 305 shown in FIG. 4, the computing system 130 may select at least one of: (i) a machine-learned clustering model for the seat ventilation function, (ii) a machine-learned clustering model for the seat massage function, or (iii) a machine-learned model for the window function. The computing system 130 may select various models by parsing the context data 305 to determine a data type and determine a respective model for that data type. The computing system 130 may select various models by invoking (e.g., with a function call) a particular model for processing a particular portion of context data 305 (e.g., invoking a respective model for a respective column of tabulated data, etc.).

The computing system 130 may generate, using a machine-learned clustering model 320, a user-activity cluster 500A-C for a vehicle function 165A-C based on the context data 305. The machine-learned clustering model 320 may be configured to identify a user-activity cluster 500A-C based on at least a portion of the user-selected settings 310 and at least a portion of the one or more observed conditions 315 associated with the respective user-selected settings. More particularly, the machine-learned clustering model 320 may be configured to perform cluster analysis to group (or segment) datapoints with shared attributes in order to extrapolate an algorithmic relationships between the user-selected settings 310 of a particular vehicle function 165A-C and the observed conditions 315.

Figure 5A:
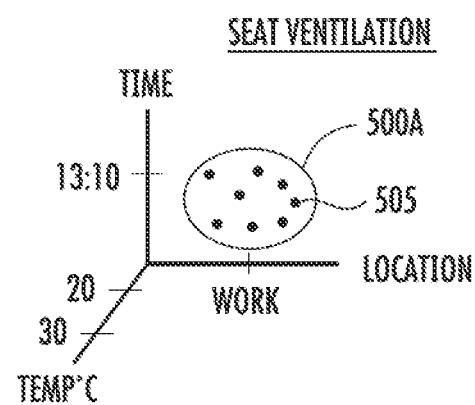
FIGS. 5A-D illustrate example user-activity clusters according to an embodiment hereof.
Figure 5B:
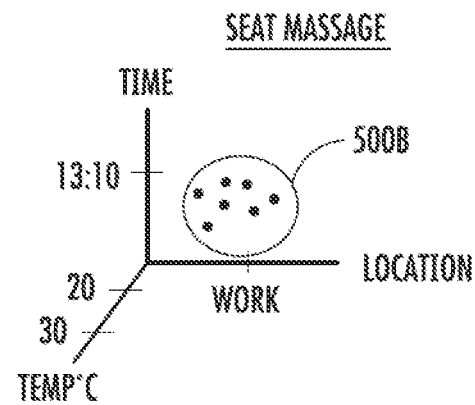
Figure 5C:
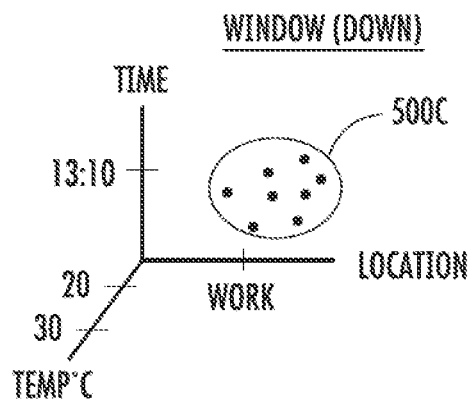
Figure 5D:
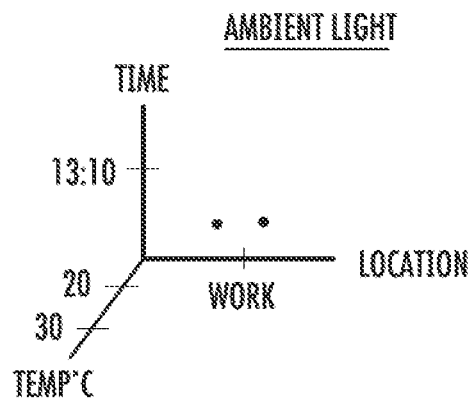

By way of example, with reference to FIGS. 5A-D, the computing system 130 may record a plurality of datapoints over the course of a workweek. Each datapoint may be associated with a particular user interaction with a vehicle function 165A-C and may represent user-specific variables for a given user interaction. For example, each data point may be indicative of the observed conditions (e.g., time, location, temperature) and may include metadata indicative of the user-selected setting 310 with the respective vehicle function. For instance, FIG. 5A shows the example datapoints 505 recorded for the user interactions with the ventilation function (e.g., setting to level three). FIG. 5B shows the example datapoints recorded for the user interactions with the seat massage function (e.g., setting it to "classic massage"). FIG. 5C shows the example datapoints recorded for the user interactions with the window function (e.g., opening the window). FIG. 5D shows the example datapoints recorded for the user interactions with the staging function (e.g., selecting an ambient light setting).

The machine-learned clustering model 320 may be configured to process the context data 305 (e.g., context data resulting in datapoints 505) using probabilistic clustering to generate a user-activity cluster 500A-C. A user-activity cluster 500A-C may be a specific set of values of contextual features based on time, location, and other observed conditions 315. The user-activity cluster 500A-C groups together the datapoints 505 of the context data 305 that indicate enough commonality among one another to represent a personalized routine of the user 120. In an embodiment, the machine-learned clustering model 320 may apply a probability distribution to the datapoints, which may describe the probability (e.g., confidence) that a datapoint belongs within a user-activity cluster 500A-C. By way of example, the machine-learned clustering model 320 may be configured to generate a first user-activity cluster 500A indicative of a routine of the user 120 when interacting the seat ventilation function. The first user-activity cluster 500A may be considered complete (or closed) when the model analyzes enough datapoints so that it has a threshold confidence level that those datapoints are to be grouped as the first user-activity cluster 500A. A similar process may be utilized to generate the second user-activity cluster 500B for the seat massage function and the third user-activity cluster 500C for the window function.

The machine-learned clustering model 320 may be configured to determine the boundaries of the user-activity cluster 500A-C for the vehicle function based on the one or more observed conditions 315. For example, the boundaries of the user-activity clusters 500A-C may be defined by the outer-most times, locations, and temperatures of the datapoints included in the respective user-activity clusters 500A-C. The boundaries of the user-activity clusters 500A-C may be defined by a cutoff probability of probability distributions along the dimensions of the user-activity clusters 500A-C. The boundaries of the user-activity clusters 500A-C may be defined by a distance from an anchor point of a given cluster (e.g., a centroid, etc.). The boundaries of the user-activity clusters 500A-C may be implicitly encoded in the parameters of a machine-learned classification model configured to receive a set of input context data and output a classification (e.g., a cluster classification).

In an embodiment, the machine-learned clustering model 320 may not generate a user-activity cluster in the event it has not reached a threshold confidence level. By way of example, as illustrated in FIG. 5D, the context data 305 only includes two user interaction datapoints for the staging function over the represented timeframe. Thus, the machine-learned clustering model 320 may not have enough data/confidence yet to generate a user-activity cluster potentially representing a routine for the staging function.

Returning to FIG. 3, the computing system 130 may determine an automated vehicle action 330 for a respective vehicle function 165A-C based on the user-activity cluster 500A-C for that vehicle function 165A-C. The automated vehicle action 330 may be considered a skill/routine of the vehicle 105 that describes the automated execution of a vehicle function 165A-C based on the context. For instance, the automated vehicle action 330 may be indicative of an automated setting 335 for the vehicle function 165A-C and one or more triggering conditions 340 for automatically implementing the automated setting 335. More particularly, the automated vehicle action 330 may define a relationship between the one or more triggering conditions 340 and the one or more settings 335 of the vehicle function 165A-C. By way of example, as further described herein, the automated vehicle action 330 may include a logic statement (e.g., an if/then statement) or a learned model output indicating that if the triggering conditions 340 are detected, then the vehicle 105 is to automatically control the vehicle function 165A-C in accordance with the automated setting 335 (e.g., to activate the setting).

In an embodiment, to help determine the automated vehicle action 330, the computing system 130 may use, or otherwise leverage, a vehicle action model 325. The vehicle action model 325 may be responsible for learning the preferences of the user 120 amongst different settings/programs associated with a vehicle function 165A-C.

The vehicle action model 325 may include a weighting algorithm that may be applied to a learned user-activity cluster 500A-C. For instance, the vehicle action model 325 may be a rules-based model configured to apply a respective weight 345 to each of the respective user-selected settings 310 within the user-activity cluster 500A-C. A weight 345 may be, for example, a number assigned to each user-selected setting 310, indicating its importance in terms of user preference.

Every user-activity cluster 500A-C may have an independent set of weights 345 associated to it that correspond to the vehicle function 165A-C. For example, a set of weights 345 applied to a first user-activity cluster 500A associated with a seat ventilation function may be different than a set of weights 345 applied to a second user-activity cluster 500B associated with a window function. The seat ventilation function may have several ventilation levels (e.g., 1, 2, 3, 4, 5, etc.) while the window function may include two states (e.g., open, close). As a result, in an embodiment, additional weighting may be performed for the first user-activity cluster 500A associated with the seat ventilation function than for the second user-activity cluster 500B associated with the window function.

The computing system 130 may process a user-activity cluster 500A-C using the vehicle action model 325 and determine the automated setting 335 for a vehicle function 165A-C, based on the weights 345 of the respective user-selected settings 310 within the user-activity cluster 500A-C. In an embodiment, the weights 345 for each possible setting of the vehicle function 165A-C may be set to be same value at the time of cluster creation. The vehicle action model 325 may adjust/update the weight 345 of a user-selected setting 310 using a set of rules when the user interacts with the vehicle function 165A-C to make that user-selected setting 310.

The rules may be based on the type of interaction the user 120 has with the vehicle function 165A-C. For instance, the set of rules for adjusting the weights 345 may include a positive interaction rule, a negative interaction rule, and a neutral interaction rule. In an embodiment, the positive interaction rule may indicate that the weight for a particular user-selected setting 310 is to be increased (e.g., by +1) when the user 120 activates (e.g., turns on, opens) that user-selected setting 310. In an embodiment, the negative interaction rule may indicate that the weight for a particular user-selected setting 310 is to be decreased (e.g., by −1) when the user 120 inactivates (e.g., turns off) that user-selected setting 310 or performs an action that is explicitly opposite of the positive interaction (e.g., closing a window).

In an embodiment, a neutral interaction rule may indicate that the weight 345 for a particular user-selected setting 310 is not to be changed based on the user's interaction. This may occur when conditions for a user-activity cluster 500A-C occur but the user 120 does not perform an action that has been historically performed in that context. By way of example, a neutral interaction may be identified when the user 120 neither actively closed the window, nor opened the window but rather did not interact with the window and left the state unchanged despite the occurrence of observed conditions 315 that would fall within the scope of the user-activity cluster 500C. In some implementations, neutral interactions may be treated as negative reinforcement (e.g., for seating heating, ventilation).

In an embodiment, the vehicle action model 325 may be configured to represent the user interactions with a vehicle function 165A-C as a distribution. For instance, the user interactions may be modelled as a multinomial distribution. The multinomial distribution may include a distribution over observed counts of each possible category in a set of categorically distributed observations. Under this approach, the weights 345 may be parameterized by a Dirichlet distribution (e.g., a conjugate prior of multinomial distribution).

In an embodiment, each respective user-activity cluster 500A-C may have an independent Dirichlet distribution that corresponds to the user interactions with the associated vehicle function 165A-C. The parameters of the Dirichlet distribution may encompass information representing a confidence of a specific user-selected setting 310 being used by the user 120 and its probability relative to the other settings for the respective vehicle function 165A-C. The mean of the parameter for every setting/program of a vehicle function 165A-C may constitute the likelihood of it being used by the user 120 within that user-activity cluster 500A-C (e.g., given the observed conditions). In an embodiment, for every vehicle function 165A-C with "X" number of settings/programs, the Dirichlet distributions for each user-activity cluster 500A-C may have (X+1) parameters: one each for each possible setting/program and an additional one for the "off" setting.

The parameters (e.g., weights) may be updated following the above positive and negative rules based on the user interactions with the associated setting/program. In an example, a positive reinforcement may correspond to a step increase in the weight of the user-selected setting 310 within a user-activity cluster 500A-C and a negative reinforcement may correspond to a step increase in the weight of the "off" setting.

The vehicle action model 325 may be configured to generate a similar type of distribution to identify a day-of-the-week preference within each user-activity cluster. For instance, the seven days of the week may also be modelled as a Dirichlet Distribution. The vehicle action model 325 may initialize the weights 345 for each day at the same weight value and update the weights 345 for a respective day based on the occurrence of a user interaction on that day.

In an embodiment, the vehicle action model 325 may be configured to determine an automated vehicle action 330 based on a threshold 350. The threshold 350 may include a pre-set threshold that represents the minimum probability needed before the automated vehicle action 330 (e.g., its automated setting 335) is determined. For example, the threshold 350 may be expressed as a minimum value that the weights 345 for a particular user-selected setting 310 must reach before the vehicle action model 325 determines that it should be used as the basis for the automated setting 335.

The following provides an example how the computing system 130 may process a user-activity cluster 500A-C using the vehicle action model 325. In this example, the seat massage function may include three possible settings for activating the seat massage function: "gentle," "classic," and "firm," as well as an "off" setting. The initial weights for each of these settings may be assigned to one. This may be represented as a Dirichlet Distribution with concentration parameters [1, 1, 1, 1]. Within the same user-activity cluster (e.g., given similar observed conditions 315), the user 120 may interact with the "gentle" setting one time and the "classic" setting four times. The "gentle" setting and the "classic" setting may be considered user-selected settings 310 and the computing system 130 may adjust their associated weights accordingly. For example, the computing system 130 (e.g., the vehicle action model 325) may update the corresponding Dirichlet parameters to [1+1, 1+4, 1, 1]=[3, 5, 1, 1]. These weight values may be converted to probability weights by diving by total weight e.g., 3+5+1+1=10. Accordingly, the probability for each may be [0.3, 0.5, 0.1, 0.1], indicating that the vehicle action model 325 has a 30%, 50%, 10% and 10% confidence for each of the settings, respectively. Thus, the vehicle action model 325 may determine that the "classic" massage setting is the preferred setting of the user 120 within this particular user-activity cluster 500A. Accordingly, the vehicle action model 325 may select the "classic" massage setting as the automated setting 335 for a given automated vehicle action 330.

In an embodiment, an action explanation model 355 may construct a decision-making framework that explains the patterns of user activity revealed by the processed user-activity clusters 500A-C. The action explanation model 355 may leverage rule-based or heuristic-based techniques as well as machine-learned approaches. The action explanation model 355 may be configured to convert the user-activity clusters 500A-C and automated settings 335 into automated vehicle actions 330 that mimic the patterns of user activity. The action explanation model 355 may be configured to help generate the automated vehicle action 330 into a form that is digestible for the vehicle 105 or for the user 120. This may include, for example, helping to determine the triggering conditions 340 for automatically executing the automated setting 335 of the vehicle function 165A-C.

In an embodiment, the action explanation model 355 may operate on context data 305 directly (e.g., accessing user-selected settings 310). Additionally, or alternatively, the action explanation model 355 may probabilistically sample simulated user activity within the clusters based on relative probabilities determined for the various settings, optionally without access to user-selected settings 310. Such simulated user activity provides training data for training/testing the decision-making frameworks generated by the action explanation model 355.

In an embodiment, the action explanation model 355 may develop decision-making boundaries in the context-feature space. The decision-making boundaries may provide interpretable ranges of parameter values for the context data that, taken together, may approximate the areas of the context-feature space output by the machine-learned clustering models.

In an embodiment, the action explanation model 355 may process data using a rule-based approach that finds deterministic feature bounds for the context features used in clustering. The context features may include the observed conditions 315 (e.g., latitude, longitude, temperature, time of the day). For every user-activity cluster 500A-C, the individual dimensions of a multivariate gaussian may be assumed to be independent gaussian distributions. The feature bounds may be defined by the following range [minimum value, maximum value]=[m−l·s, m+l·s], where m is the mean of the feature, s is the standard deviation of the individual distribution, and/is a hyperparameter that may take values between 1 to 3 depending on the level of desired granularity of the automated vehicle actions 330. The minimum and maximum values of the feature bounds may be utilized for determining the triggering conditions 340 for the automated setting 335 of the vehicle function 165A-C.

In an embodiment, the action explanation model 355 may obtain decision boundaries in the context-feature space that form hyperrectangles or hypercubes. For instance, a side of a hyperrectangle may be a range of values of a given feature (e.g., the endpoints of the segment forming the side being the minimum and maximum of the range).

In an embodiment, the action explanation model 355 may evaluate a relative influence of one or more context features (e.g., one or more dimensions in the context feature space). For instance, some context feature dimensions may not have a meaningful impact on the feature setting, and thus may be deprioritized or ignored, even though present in the determined cluster. For instance, some characteristics may be random, may be proxies for other features, or may be incompletely observed. For instance, the action explanation model 355 may determine that time of day is not as influential as exterior temperature as it relates to an interior heat setting. Thus the action explanation model 355 may determine to omit or relax a decision boundary on a time axis in the context feature space for a heating setting. For instance, even if a user has never turned on the heat at a time outside a set of prior observed behavior (e.g., 3 am), the action explanation model 355 may determine a decision boundary that does not exclude that data point on the basis of that outlier time value when more influential criteria are met (e.g., outside temperature below 32 degrees F.).

In an embodiment, the action explanation model 355 may include one or more hypercubes 360 that may be considered as "approximators" for each of the user-activity clusters 500A-C and a multicube 365 that may be defined as a collection of hypercubes 360. The multicube may be a three-way bridge between the vehicle action model 325, the collection of hypercubes 360, and the automated vehicle action 330 presented to the user 120.

In an example, the multicube 365 may train all the hypercubes 360, take the learnings of the hypercubes 360, and present them to the user 120. This may be accomplished via a three-stage approach.

At a first stage, the multicube 365 may simulate usage data for each user-activity cluster 500A-C. The multicube 365 may simulate data that emulates the different context regions that intelligently cover the phase-space learned by the machine-learned clustering model 320 using a custom Metropolis-Hastings inspired sampling algorithm. Each simulated datapoint may be a numerical vector corresponding to each context feature (e.g., observed condition 315) that is being learned and a "target" value which indicates whether the user 120 conducted a user interaction in that context space or not.

At a second stage, for each user-activity cluster 500A-C, the data may be passed on to the hypercube object that identifies the subset of context features that were the most important in the user interaction with the respective vehicle function 166A-C (e.g., the observed conditions that had the highest influence in the user-activity cluster 500A-C). For example, for a seat heating function, inside and outside temperature may be the two main factors that influenced the seat heating usage for a particular user 120. The most important features may be determined by a custom scoring function which uses the following: (i) features with highest variance; (ii) features that have higher mutual information score with respect to the "target" values in the first stage; and (iii) features that have higher chi-squared score with respect to the "target" values in the first stage.

At a third stage, for each of these important features, the action explanation model 355 may compute minimum and maximum bounds. For instance, as described herein, the hypercubes 360 may be trained for each user-activity cluster 500A-C over numerous context features (e.g., observed conditions 315). A hypercube 360 may approximate the context regions learned by the machine-learned clustering model 320 by partitioning the regions into a collection of hyperrectangles (e.g., a cube in higher dimensions). The hypercube 360 may take, as input, information generated by the machine-learned clustering model 320 and the vehicle action model 325, and approximate this into higher dimensional cubes that may be presented as automated vehicle actions 330 for the user 120. In this way, across the second and third stages, the action explanation model 355 may determine a preferred feature to use as a first side of the hyperrectangle based on the custom scoring function, determine the rules of the decision boundary that appropriately characterize the model outputs and maximize information gain in each context space with the preferred feature and a target variable, and transform the discovered rules/limits into boundaries for the edges of the hyperrectangle.

In an embodiment, the computing system 130 may determine the triggering conditions 340 utilizing additional, or alternative, statistical approaches. For instance, as described herein, the triggering conditions 340 may be based on the observed conditions 315 within a user-activity cluster 500A-C. In an example, the triggering conditions 340 may be defined by the minimum and maximum values of the observed conditions 315 within a user-activity cluster. As shown in FIG. 4, the observed conditions 315 recorded within the user-activity cluster 500A for the seat ventilation function may indicate that the user 120 activated the level three ventilation setting each day when the temperature was between 21-24 degrees Celsius. Thus, the triggering conditions 340 for activating the level three ventilation setting as an automated setting may include detecting that the temperature is above 21 degrees Celsius and below 24 degrees Celsius. In some implementations, the computing system 130 may adjust the minimum and maximum values (e.g., +/−5 degrees Celsius) based on the appropriateness for broadening (or narrowing) the triggering conditions 340. In some implementations, the trigger conditions 340 may include a threshold (based on the minimum value), above which the automated setting 335 may be activated.

In an embodiment, the triggering conditions 340 may be based on being within a certain range of the observed conditions 315. For example, as shown in FIG. 4, the observed conditions 315 recorded within the user-activity cluster 500C for the seat massage function may indicate that the user 120 activated the "classic" massage setting each day when the temperature was 24-25 degrees Celsius. Thus, a triggering condition 340 for activating the "classic" massage setting as an automated setting may include detecting that the temperature is within a certain range (e.g., +1/−5 degree Celsius) of 24-25 degrees Celsius.

In an embodiment, the triggering conditions 340 may be based on a mean or mode or centroid of the observed conditions 315 within the user-activity cluster 500A-C. For instance, the observed conditions 315 recorded within the user-activity cluster 500B may indicate that the user 120 opened the driver's side window when the vehicle 105 was within "X" meters from a central location (e.g., corresponding to the user's work). The central location may be determined based on a mean or a mode of the latitude and longitude coordinates within the observed conditions 315 of the user-activity cluster 500B. In an example, the distance "X" may be defined by the maximum distance from the central location at which the user 120 opened the driver's side window. The triggering conditions 340 for automatically opening the driver's side window may include detecting that the vehicle 105 is within "X" distance from the central location.

The computing system 130 may output the automated vehicle action 330. As described herein, the automated vehicle action 330 may include the automated setting 335 (e.g., the highest weighted user-selected setting 310) and one or more triggering conditions 340 indicating the circumstances in which the vehicle 105 is to automatically activate the automated setting 335. This may be expressed, for example, as a logical relationship: "When (trigger conditions occur) then do (automated setting) for the associated vehicle function." In an embodiment, the computing system 130 may assign a name to an automated vehicle action 330 that is reflective of the associated vehicle function (e.g., ventilation), automated setting (e.g., level three), triggering conditions (e.g., near location, time-of-day, temperature), or other characteristics.

The computing system 130 may inform the user 120 of an automated vehicle action 330. To do so, the computing system 130 may utilize the action explanation model 355, which may be configured to generate content for presentation to the user 120 via a user interface of a display device. The content may be based on the described approaches for generating an automated vehicle action 330 that is digestible for a user (e.g., by developing the content using hypercubes 360). The content may suggest the automated vehicle action 330 to the user and may request for the user 120 to approve the automated vehicle action 330 (e.g., via user input to the display device). The content may indicate the vehicle function 165A-C, the automated setting 335, and the one or more triggering conditions 340 associated with the automated vehicle action 330. The display device may include, for example, a touchscreen of an infotainment system onboard the vehicle 105 or a touchscreen of a user device 115 of the user 120.

By way of example, with reference to FIG. 6, the user-activity cluster 500A may result in an automated vehicle action 600 for the seat ventilation function. The automated vehicle action 600 may indicate that the automated setting 605 (e.g., ventilation level three) of the seat ventilation function will be activated, if the triggering conditions 610 (e.g., location, time, and temperature conditions) are detected. The automated vehicle action 600 may be presented as content on user interface 615 of display device 620 (e.g., onboard the vehicle 105). In an embodiment, the content may be generated as a prompt for the user 120. The user 120 may interact with the user interface 615 (e.g., by providing a touch input to a user interface soft button element) to accept the automated vehicle action 600, manually adjust the triggering conditions 610, disregard, disable, or delete the automated vehicle action 600, or select that the user 120 may decide whether to implement the automated vehicle action 600 at a later time.

In another example, FIG. 7 illustrates content for presentation to the user 120 regarding automated vehicle action 700. The user-activity cluster 500B may result in an automated vehicle action 700 for the seat massage function. The automated vehicle action 700 may indicate that the automated setting 705 of the seat massage function (e.g., the "classic" massage setting) will be activated if the triggering conditions 710 (e.g., location, time, and temperature conditions) are detected. The automated vehicle action 700 may be presented as content on user interface 715 of display device 720 (e.g., onboard the vehicle 105). The user 120 may interact with the user interface 715 (e.g., via a user interface element) to accept the automated vehicle action 700, manually adjust the triggering conditions 710, disregard, disable, or delete the automated vehicle action 700, or select that the user 120 may decide whether to implement the automated vehicle action 700 at a later time.

In another example, FIG. 8 illustrates content for presentation to the user 120 regarding automated vehicle action 800. The user-activity cluster 500C may result in an automated vehicle action 800 for the window function. The automated vehicle action 800 may indicate that the automated setting 805 of the window function (e.g., open driver's window) will be activated, if the triggering conditions 810 (e.g., location, time, and temperature conditions) are detected. The automated vehicle action 800 may be presented as content on user interface 815 of display device 820 (e.g., onboard the vehicle 105). The user 120 may interact with the user interface 815 (e.g., via a user interface element) to accept the automated vehicle action 800, manually adjust the triggering conditions 810, disregard, disable, or delete the automated vehicle action 800, or select that the user 120 may decide whether to implement the automated vehicle action 800 at a later time.

Returning to FIG. 3, in an embodiment, the computing system 130 may determine whether a conflict between a newly generated automated vehicle action 330 and a pre-existing automated vehicle action exists or does not exist. Such deconflicting may occur before presenting the automated vehicle action 330 to the user 120 or before storing the automated vehicle action 330 in a database 230 for execution by the vehicle 105.

To perform the de-conflicting analysis, the computing system 130 may utilize a conflict analyzer 370. The conflict analyzer 370 may be implemented as a module of the computing system 130. The conflict analyzer 370 may be configured to determine whether an automated vehicle action 330 conflicts with another pre-existing automated vehicle action (e.g., stored in database 230). A conflict may be determined to exist if it is not possible for the vehicle 105 to perform both automated vehicle actions without modifying one of them.

The conflict analyzer 370 may determine whether a conflict exists between automated vehicle actions in a variety of manners. In an embodiment, the conflict analyzer 370 may determine that a conflict exists in the event that two automated vehicle actions are assigned the same name. The conflict analyzer 370 may be configured to detect a name conflict using string comparison or substring check analysis.

In an embodiment, the conflict analyzer 370 may determine that a conflict exists between automated vehicle actions based on a domain associated with the context of the automated vehicle action 330 or the vehicle function 165A-C to be controlled. Domains of conflict may be identified by which controller 170A-C (or ECUs) are associated with the performance of the automated vehicle actions 330. To the extent that the vehicle actions involve the same controller 170A-C (or ECU) and the controller 170A-C cannot concurrently implement both automated settings, the computing system may determine a conflict exists. For example, a climate-based automated vehicle action cannot simultaneously set the climate control temperature to maximum heat and maximum cool.

In an embodiment, the conflict analyzer 370 may determine whether a conflict exists between an automated vehicle action 330 and an action being undertaken by the vehicle 105 because of a user's express command. For instance, the user 120 may provide an audio input (e.g., a spoken voice command) to the vehicle 105 to perform navigation guidance to a place of interest (e.g., a restaurant). The triggering conditions 340 of the automated vehicle action 330 may indicate that an automated navigation setting for guidance to the user's work would be executed at the same time. Accordingly, the conflict analyzer 370 may determine that there is a conflict between the voice-activated navigation and the automated vehicle action 330.

The computing system 130 may address a conflict based on one or more conflict resolution policies 375. The policies 375 may be programmed to automatically resolve which of the automated vehicle actions is enabled and which is disabled. One example policy may include enabling the more recently determined automated vehicle action and disabling the other one. Another example policy may include enabling the automated vehicle action that is more likely to occur with high frequency (e.g., during a morning commute) and disabling the other one (e.g., that is only activated during a particular season). Additionally, or alternatively, another example policy may include enabling or disabling automated vehicle actions based on a hierarchy of the automated vehicle actions. Additionally, or alternatively, another example policy may include favoring the setting of a vehicle function according to a user's express command over an automated vehicle action. Additionally, or alternatively, another example policy may include favoring an automated vehicle action created onboard the vehicle 105 (e.g., via computing system 130) over an automated vehicle action created offboard the vehicle 105 (e.g., via computing platform 110).

Additionally, or alternatively, an example policy may be configured to help resolve a conflict based on the context of the vehicle 105. For instance, a policy may be configured to prevent the activation of a certain function given the weather, traffic conditions, noise levels, or other current or future circumstances of the vehicle 105. By way of example, an automated vehicle action associated with opening a window (e.g., a sunroof) may not be activated if it is (or is predicted to be) raining, noisy, etc. A prediction for rain, elevated noise level, etc. may be determined based on data indicating future operating conditions of the vehicle 105 (e.g., weather data forecasting rain, route data shows a route through a noisy area). This may help resolve a conflict between automated vehicle actions by favoring an automated vehicle action that is more appropriate in light of the vehicle's context.

In an embodiment, if none of the policies 375 automatically resolve the conflict, the user 120 may be presented with content on a user interface to manually resolve the conflict. The content may include a prompt asking the user which automated vehicle action is to be enabled and which is to be disabled. A disabled automated vehicle action may remain disabled until, for example, it is manually adjusted by the user 120.

The computing system 130 may output command instructions 380 based on the automated vehicle action 330. The command instructions 380 may be computer-executable instructions for the vehicle 105 to implement the automated vehicle action 330 for automatically controlling the vehicle function 165A-C in accordance with the automated setting 335 based on whether the vehicle 105 detects the one or more triggering conditions 340.

In an embodiment, the computing system 130 may store the command instructions 380 in an accessible memory on the vehicle 105 for execution at a subsequent time. For example, the command instructions 380 may be stored in the automated vehicle action database 230 with the command instructions associated with other automated vehicle actions. The database 230 may be updated as new automated vehicle actions are created, existing automated vehicle actions are changed, disabled, enabled, etc.

The computing system 130 may execute the command instructions 380 at a subsequent time. For example, at a later time, the computing system 130 may detect an occurrence of the one or more triggering conditions 340. The detection may be based on signals produced by the vehicle function services 205A-C. The signals may encode data indicative of the triggering conditions 340 (e.g., time, temperature, location, weather, traffic, etc.). Based on the triggering conditions 340, the computing system 130 (e.g., the vehicle embedded service 225) may transmit a signal to implement the automated setting 335 by the vehicle 105. The signal may be transmitted to a controller 170A-C that is configured to activate/adjust the vehicle function 170A-C to the automated setting 335 (e.g., to start the classic massage program).

In an embodiment, the computing system 130 may generate content (e.g., a notification) indicating that the vehicle 105 is implementing or has implemented the automated setting 335. The content may be presented to the user 120 via a user interface of a display device (e.g., of the vehicle's infotainment system). In an embodiment, the user 120 may provide user input to stop, snooze or delay (e.g., for implementation at another time), or cancel, or disable the automated vehicle action 330.

In an embodiment, the command instructions 380 may be stored in a one or more collections for indexing automated vehicle actions. A respective collection may include the collections of automated settings 335, triggering conditions 340, etc.

For example, FIGS. 9A-B illustrates data structures 900A-B that include a plurality of automated vehicle actions. The data structure 900A may be, for example, a table, list, etc. that indexes the respective automated vehicle actions. The automated vehicle actions may be represented as objects that store automated setting objects and triggering condition objects. The objects may also maintain a set of metadata useful in identifying the automated vehicle action uniquely such as a serial number, a unique identifier, an assigned name, etc. In an embodiment, automated vehicle actions may be stored or indexed according to the type of action (e.g., ClimateControlAction, NavigationRouteAction, etc.). In an embodiment, an automated vehicle action may be associated with an action affinity that defines the responsibilities of the computing system 130 (e.g., the vehicle embedded service 225) or the computing platform 110 (e.g., the cloud embedded service 235) for a particular automated vehicle action.

The command instructions 380 may be stored in association with a user profile of the user 120. For example, the data structure 900A may be associated with a first user profile associated with a first user 120 and the data structure 900B may be associated with a second user profile associated with a second user 175 (shown in FIG. 1). In this way, the database 230 may indicate which automated vehicle actions are associated with which users.

In an embodiment, the computing system 130 may transmit, over a network 125 to computing platform 110 (e.g., a server system), a communication indicative of the command instructions 380 for storage in association with a user profile of a user 120 offboard the vehicle 105. For instance, the computing platform 110 may receive the communication and store the command instructions in cloud database 240 in associated with the user profile of the user 120. In the event that the user 120 enters a second vehicle 180 (shown in FIG. 1), the computing platform 110 may provide the second vehicle 180 with data indicative of the command instructions 380 for the automated vehicle actions associated with the user profile of the user 120. Accordingly, the user 120 may experience the automated vehicle actions determined by a first vehicle 105 while in a second vehicle 180.

In an embodiment, the computing platform 110 may be configured to aggregate automated vehicle actions across a plurality of users. For example, the computing platform 110 (e.g., the cloud embedded service 235) may obtain data indicative of a plurality of automated vehicle actions that were generated by a plurality of different vehicles for a plurality of different users. Such data may be stored, for example, in the cloud database 240. The computing platform 110 may analyze the data to generate an aggregation cluster containing a plurality of automated vehicle actions from a plurality of different users. In an example, the computing platform 110 may determine the aggregation cluster using similar clustering analyses and machine-learned models as previously described herein. The automated vehicle actions within the aggregation cluster may be related in that they are associated with similar vehicle functions, have similar triggering conditions, etc. Additionally, or alternatively, the users associated with the cluster may have common attributes such as, for example, being located in the same or similar geographic area, similar weather conditions, etc.

The computing platform 110 may be configured to suggest an automated vehicle action to a user based on an analysis of the aggregation cluster. For instance, the computing platform 110 may apply a vehicle action model to weigh the plurality of automated settings within the aggregation cluster based on their respective frequencies within the aggregation cluster. The computing platform 110 may identify the automated setting with the highest weight and selected it as a suggested automated setting. Using similar techniques as previously described herein, the computing platform 110 may determine suggested triggering conditions for the suggested automated setting based on the aggregation cluster (e.g., based on the triggering conditions actions included therein). The computing platform 110 may generate a suggested vehicle action to the user 120 based on the suggested automated setting and the suggested triggering conditions.

The computing platform 110 may transit a communication indicative of the suggested vehicle action to a vehicle 105 associated with the user 120 or a user device 115 associated with the user 120. The computing system 130 of the vehicle 105 may receive the communication and process it for presentation to the user 120. In an example, the computing system 130 may generate content for presentation to the user 120 via a display device onboard the vehicle 105. The content may include the suggested vehicle action and prompt the user 120 to approve, discard, or ignore the suggestion. In the event that the user 120 approves, the computing system 130 may store the suggested vehicle action as an automated vehicle action in the action database 230 (e.g., in associated with the user profile of the user 120).

In an embodiment, the computing system 130 may transmit a communication to the computing platform 110 to indicate the user's approval of the suggested vehicle action. The computing platform 110 may store the suggested vehicle action as an automated vehicle action in the cloud database 240 (e.g., in associated with the user profile of the user 120). Additionally, or alternatively, the computing platform 110 may utilize the feedback to help re-train the models used for generating the aggregate clusters, suggested vehicle action, etc.

In an embodiment, the user device 115 may additionally, or alternatively, perform the operations and functions of the computing system 130 with respect to the suggested vehicle actions.

Figure 10A:
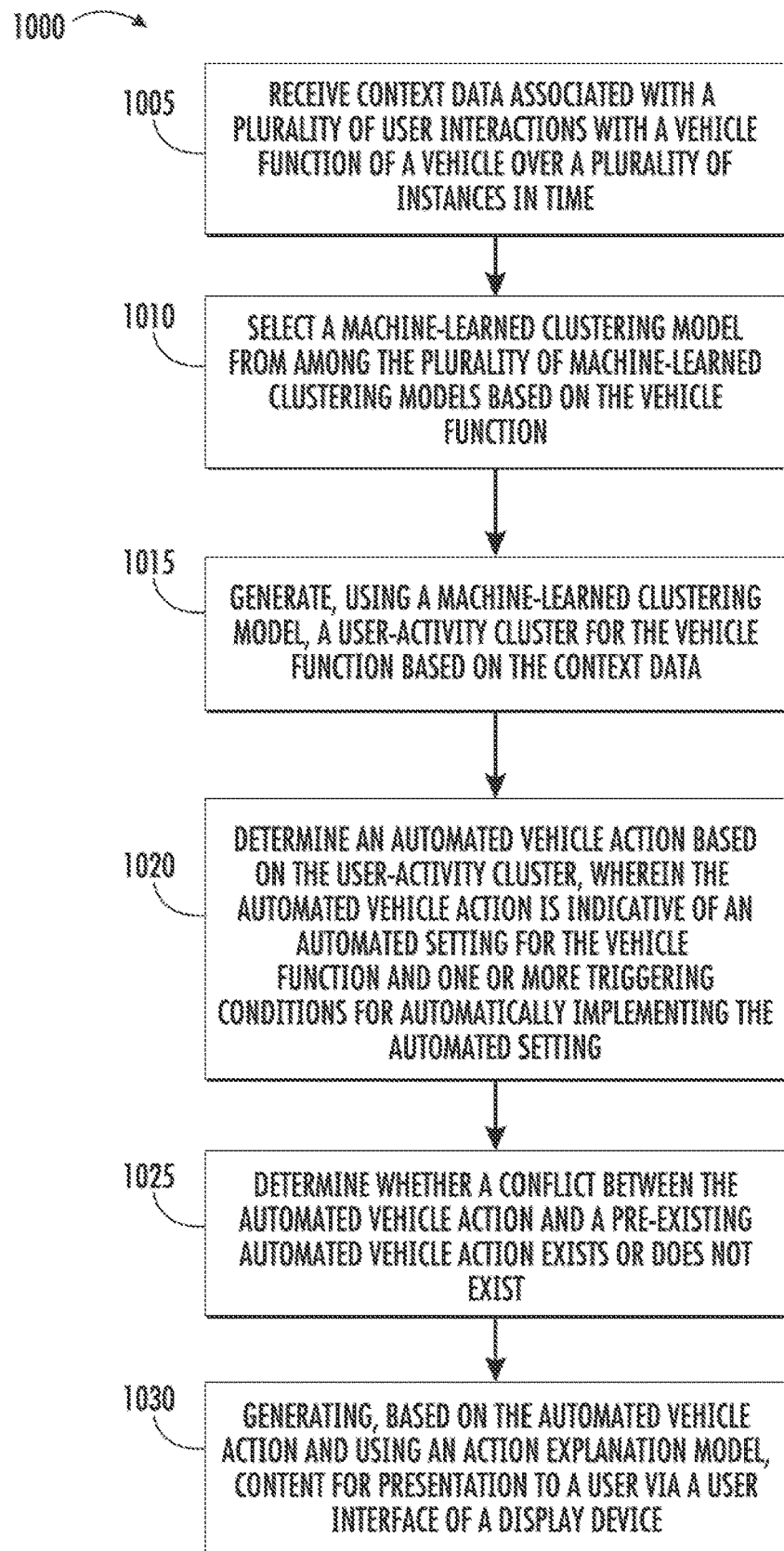
FIGS. 10A-B illustrate a flowchart diagram of an example method for generating automated vehicle actions for a user according to an embodiment hereof.
Figure 10B:
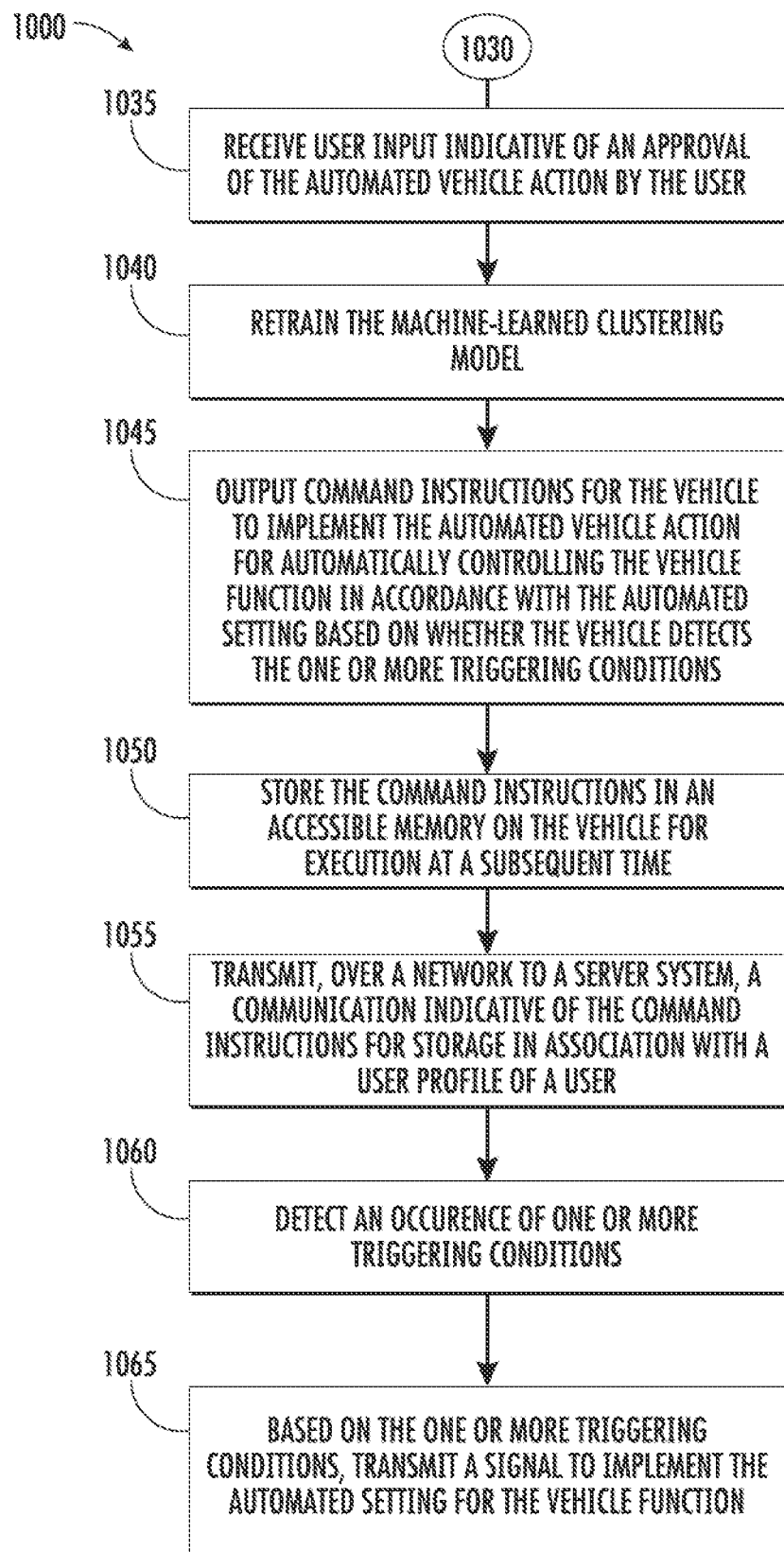

FIGS. 10A-B illustrate flow diagrams that depict an example method 1000 for generating automated vehicle actions according to an embodiment hereof. The method 1000 may be performed by a computing system described with reference to the other figures. In an embodiment, the method 1000 may be performed by the control circuit 135 of the computing system 130 of FIG. 1. One or more portions of the method 1000 may be implemented as an algorithm on the hardware components of the devices described herein (e.g., as in FIGS. 1-3, 6-8, and 12), for example, to generate automated vehicles actions as described herein. For example, the steps of method 1000 may be implemented as operations/instructions that are executable by computing hardware.

FIGS. 10A-B illustrate elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIGS. 10A-B are described with reference to elements/terms described with respect to other systems and figures for example illustrated purposes and is not meant to be limiting. One or more portions of method 1000 may be performed additionally, or alternatively, by other systems. For example, method 1000 may be performed by a control circuit 185 of the computing platform 110.

In an embodiment, the method 1000 may begin with or otherwise include a step 1005, in which the computing system 130 receives context data 305 associated with a plurality of user interactions with a vehicle function 165B of a vehicle 105 over a plurality of instances in time. The context data 305 may include data indicative of a plurality of user-selected settings 310 for the vehicle function 165B and data indicative of one or more observed conditions 315 associated with the respective user-selected settings 310. For example, a user 120 may interact with a knob, button, etc. to activate a massage setting of a seat massage function, each day for a week. The context data 305 may indicate the particular massage setting and the time, temperature, and location conditions when the setting was selected.

The method 1000 in an embodiment may include a step 1010, in which the computing system 130 selects a machine-learned clustering model 320 from among the plurality of machine-learned clustering models based on the vehicle function 165B. As described herein, each respective machine-learned clustering model 320 may be dedicated to a particular vehicle function 165A-C of the vehicle 105. The computing system 130 may process the context data 305 to identify which of the vehicle functions 165A-C it pertains to (e.g., by identifying an indicator encoded in the data, identify a vehicle function service that provided the data) and access the machine-learned clustering model 320 associated with that vehicle function. In an example, in the event that the context data 305 is indicative of user interactions with a seat massage function, the computing system 130 may access the machine-learned clustering model 320 for the seat massage function.

The method 1000 in an embodiment may include a step 1015, in which the computing system 130 generates, using a machine-learned clustering model 320, a user-activity cluster 500B for the vehicle function 165B based on the context data 305. As described herein, the machine-learned clustering model 320 may be trained to identify the user-activity cluster 500B based on at least a portion of the user-selected settings 310 and at least a portion of the one or more observed conditions 315 associated with the respective user-selected settings 310. For example, the machine-learned clustering model 320 may generate a user-activity cluster 500B containing certain datapoints 505 that are associated with user interactions with the seat massage function. The machine-learned clustering model 320 may group the datapoints 505 based on a similarity or pattern among them. This may include, for example, the activation of the seat massage function within a similar time range, temperature range, location range, etc. As described herein, the machine-learned clustering model 320 may apply a probability distribution to the datapoints 505, which may help determine the probability (e.g., confidence) that a datapoint 505 belongs within the user-activity cluster 500B (e.g., for the seat massage function).

The method 1000 in an embodiment may include a step 1020, in which the computing system 130 determines an automated vehicle action 330 based on the user-activity cluster 500B. The automated vehicle action 330 may be indicative of an automated setting 335 for the vehicle function 165B (e.g., vehicle comfort function) and one or more triggering conditions 340 for automatically implementing the automated setting 335. More particularly, as described herein the automated vehicle action 330 may be expressed as a dependent relationship (e.g., if/then statement) between the implementation of the automated setting 335 and the triggering conditions 340.

In an embodiment, the computing system 130 may determine the automated vehicle action 330 in step 1020 using a vehicle action model 325. The vehicle action model 325 may include, for example, a weighting algorithm that may be applied to the user-activity cluster 500B. The particular weighting scheme may be specific to the vehicle-function 165B. In an example, the vehicle action model 325 may provide a weighting scheme that is specific to a seat massage function (e.g., given the number of massage settings). The vehicle action model 325 may assign weight to each user-selected setting 310 as the user interacts with the seat massage function. In an embodiment, the vehicle action model 325 may identify the user-selected setting 310 with the highest weight (e.g., the classic massage setting) in the user-activity cluster 500B as the one preferred by the user 120. Accordingly, the computing system 130 may set the highest weighted user-selected setting 310 as the automated setting 335 to be implemented in performance of the automated vehicle action 330.

The computing system 130 may determine the triggering conditions 340 for the automated setting 335 in step 1020 based on the user-activity cluster 500B. As described herein, the triggering conditions 340 may be based on the observed conditions 315 appearing in the user-activity-cluster 500B. In an example, the time, location, and/or temperature conditions for automatically activating a classic massage setting may be based on the observed time, location, and temperatures at which the user 120 selected this setting over time.

The method 1000 in an embodiment may include a step 1025, in which the computing system 130 determines whether a conflict between the automated vehicle action 330 and a pre-existing automated vehicle action exists or does not exist. In an embodiment, the computing system 130 may compare the triggering conditions 340 of the new automated vehicle action 330 and the pre-existing automated vehicle action to determine if the actions could be triggered concurrently. If so, the computing system 130 may compare the automated setting 335 of the newer automated vehicle action 330 and the automated setting of the pre-existing automated vehicle action to determine whether the settings may be implemented concurrently. Settings may not be implemented concurrently, for example, if an associated controller 170B (or ECU) could not activate the settings during an overlapping time period. By way of example, a controller 170B for a seat massage function of a driver's seat may be programed to only activate one massage setting at a time. Thus, the controller 170B may not be able to activate the classic massage setting of the new automated vehicle action and the gentle massage setting of a pre-existing automated vehicle action in the event these actions could be triggered by the same conditions. In the example, the computing system 130 may determine that a conflict exists and the method 1000 may return to step 1005. In the event no conflict exists, the method 1000 may continue.

The method 1000 in an embodiment may include a step 1030, in which the computing system 130 generates, based on the automated vehicle action 330 and using an action explanation model 355, content for presentation to a user 120 via a user interface of a display device. The content may indicate the vehicle function 165B, the automated setting 335, and the one or more triggering conditions 340. Example content is shown in FIG. 7, in which the user interface 715 presents a prompt to the user 120 that indicates the classic massage setting will be activated for the seat massage function if certain location, time, and temperature conditions are detected. In an embodiment, the user 120 may interact with the user interface 715 to edit the triggering conditions 710.

With reference now to FIG. 10B, the method 1000 in an embodiment may include a step 1035, in which the computing system 130 receives user input indicative of an approval of the automated vehicle action 330 by the user 120. As described herein, the user input may include a touch input to a user interface element, a voice command, etc.

In an embodiment, the user 120 may reject the automated vehicle action 330. In the event of a rejection, the method 1000 may return to step 1005.

The method 1000 in an embodiment may include a step 1040, in which the computing system 130 retrains the machine-learned clustering model 320. For instance, the computing system 130 may include a feedback training loop in which the machine-learned clustering model 320 that generated the relevant user-activity cluster 500B is trained/retrained based on the feedback of the user 120 received in step 1035. For example, the machine-learned clustering model 320 may be retrained based on whether the user 120 accepted or rejected the automated vehicle action 330. This may include, for example, modifying a hyperparameter of the machine-learned clustering model 320 (e.g., based on the feedback).

The method 1000 in an embodiment may include a step 1045, in which the computing system 130 outputs command instructions 380 for the vehicle 105 to implement the automated vehicle action 330 for automatically controlling the vehicle function 165B in accordance with the automated setting 335 based on whether the vehicle 105 detects the one or more triggering conditions 340. The command instructions 380 may include computer-executable instructions that cause the computing system 130 to monitor for the triggering conditions 340 (e.g., time, location, temperature, etc.) and, if detected, implement the automated setting 335 (e.g., activating the classic massage setting).

The method 1000 in an embodiment may include a step 1050, in which the computing system 130 stores the command instructions 380 in an accessible memory on the vehicle for execution at a subsequent time. For instance, the command instructions 380 may be stored in a memory onboard the vehicle 105 (e.g., the automated vehicle action database 230). The command instructions 380 may be executed (e.g., to activate the automated setting 335) at a later time when, for example, the user 120 approves/enables the automated vehicle action 330, the triggering conditions 340 are detected, etc.

The method 1000 in an embodiment may include a step 1055, in which the computing system 130 transmits, over a network to a server system, a communication indicative of the command instructions 380 for storage in association with a user profile of the user 120. As described herein, the command instructions 380 may be provided to a computing platform 110 (e.g., a cloud-based server system). The computing platform 110 may store the command instructions 380 in a memory offboard the vehicle 105 (e.g., cloud database 240). The command instructions 380 may be stored in associated with the user profile 245 of the user 120 such that the user's automated vehicle actions may be transferred from the computing platform 110 to one or more other vehicles, if desired. For instance, the computing platform 110 may transmit data indicative of the automated vehicle actions 330 to another vehicle (different than vehicle 105), such that the other vehicle may implement the automated vehicle actions 330 even though they were created by another vehicle (e.g., vehicle 105).

The method 1000 in an embodiment may include a step 1060, in which the computing system 130 detects an occurrence of the one or more triggering conditions 340. For instance, the computing system 130 may capture data from the sensors 150 (e.g., thermometer) of the vehicle 105 or other systems/devices onboard the vehicle 105 (e.g., clock, positioning system 155) to determine whether the triggering conditions 340 for the automated vehicle action 330 occur.

The method 1000 in an embodiment may include a step 1065, in which the computing system 130, based on the one or more triggering conditions 340, transmit a signal to implement the automated setting 335 for the vehicle function 165B. In an example, if the computing system 130 detects the occurrence of a defined set of time, temperature, and location conditions, then the computing system 130 may automatically transmit a signal to controller 170B to indicate that the seat massage function is to be set to classic massage.

Figure 11:
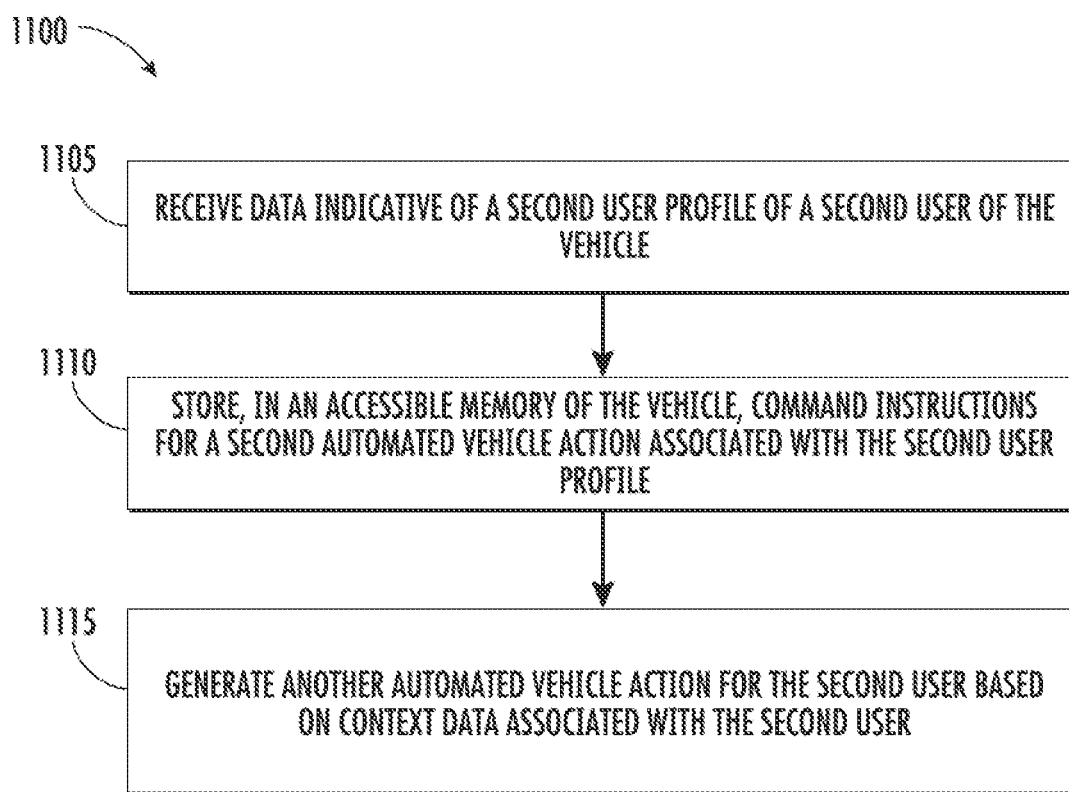
FIG. 11 illustrates a flowchart diagram of an example method for implementing automated vehicle actions for a second user according to an embodiment hereof.

FIG. 11 illustrates a flowchart diagram of an example method 1100 for implementing automated vehicle actions for a second user according to an embodiment hereof. The method 1100 may be performed by a computing system described with reference to the other figures. In an embodiment, the method 1100 may be performed by the control circuit 135 of the computing system 130 of FIG. 1. One or more portions of the method 1100 may be implemented as an algorithm on the hardware components of the devices described herein (e.g., as in FIGS. 1-3, 6-8, and 12, etc.). For example, the steps of method 1100 may be implemented as operations/instructions that are executable by computing hardware.

FIG. 11 illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 11 is described with reference to elements/terms described with respect to other systems and figures for example illustrated purposes and is not meant to be limiting. One or more portions of method 1100 may be performed additionally, or alternatively, by other systems. For example, method 1100 may be performed by a control circuit 185 of the computing platform 110.

In an embodiment, the method 1100 may begin with or otherwise include a step 1105, in which the computing system 130 receives data indicative of a second user profile of a second user 175 of the vehicle 105. In an example, the second user 175 may enter the vehicle 105 to be the driver of the vehicle 105 and another user (e.g., a first user 120) may not be in the vehicle 105 with the second user 175. In another example, the second user 175 may be in the vehicle 105 with another user (e.g., a first user 120). In such example, the second user 175 may be the driver or a passenger.

In an embodiment, the computing system 130 may receive the data indicative of the second user profile as a result of detecting that the second user 175 is within the vehicle 105. For instance, as described herein, the computing system 130 may identify a user's key or user device (e.g., through a handshake process) of the second user 175 or the second user 175 may provide user input (e.g., voice input, touch input) to indicate that the second user 175 has entered the vehicle 105. In an embodiment, the computing platform 110 may receive data indicating the user's presence in the vehicle 105 and respond by transmitting the data indicative of the automated vehicle actions associated with the second user profile to the computing system 130 onboard the vehicle 105. The automated vehicle actions associated with the second user profile/second user 175 may be ones that were determined by a different vehicle than the vehicle 105 (e.g., now being used by the second user 175).

The method 1100 in an embodiment may include a step 1110, in which the computing system 130 stores, in an accessible memory of the vehicle 105, command instructions for a second automated vehicle action associated with the second user profile. For instance, the computing system 130 may store the command instructions for the second automated vehicle action in the automated vehicle action database 230 onboard the vehicle 105.

The command instructions for the second automated vehicle action may be based on at least one user interaction of the second user with a vehicle function of another vehicle (e.g., vehicle 180). For example, the second user 175 may interact with the seat massage function of the second vehicle 180 over a plurality of instances of time. A computing system (e.g., a control circuit thereof) of the second vehicle 175 may be configured to determine the second automated vehicle action based on the user interactions of the second user 175 with the seat massage function of the second vehicle 180, using the technology and processes described herein. The computing system may output command instructions for the second automated vehicle action and transmit data indicative of the second automated vehicle action (e.g., associated command instructions) to the computing platform 110. As described herein, the computing platform 110 may store such information in association with the second user profile and transmit it to another vehicle (e.g., vehicle 105).

In an embodiment, the computing system 130 may not store command instructions for automated vehicle actions other than those associated with the second user 175. This may arise, for example, in the event that the second user 175 is the only user in the vehicle 105. Additionally, or alternatively, this may arise in the event that the second user 175 is the only user that has been detected in the vehicle 105. Additionally, or alternatively, this may arise in the event the second user 175 is the driver of the vehicle 105. The computing system 130 may execute command instructions to activate an automated setting of a vehicle function 165A-C for the second user 175 when, at a later time, the triggering conditions are detected.

In an embodiment, the computing system 130 may be configured to concurrently store command instructions for automated vehicle actions associated with a first user 120 and a second user 175. This may arise, for example, in the event the first user 120 and the second user 175 are in the vehicle 105 in a concurrent time period. Additionally, or alternatively, this may arise in the event the first user 120 and the second user 175 are frequent users of the vehicle 105.

In an embodiment, the computing system 130 may execute an automated vehicle action for a first user 120 and an automated vehicle action for a second user 175 at a concurrent/overlapping time period such that the vehicle 105 is performing two automated settings (for two different users) at the same time. By way of example, a first automated vehicle action for a first user 120 may indicate the vehicle 105 is to set the seat heating function to "low" when the outside temperature is below sixteen degrees Celsius. A second automated vehicle action for a second user 175 may indicate the vehicle 105 is to set the seat heating function to "high" when the outside temperature is below fifteen degrees Celsius.

In a similar manner as described herein, the computing system 130 may compare the vehicle functions, triggering conditions, and automated settings of the first and second automated vehicle actions to determine whether they conflict with one another. The first automated vehicle action and the second automated vehicle action may be considered to conflict in the event the vehicle 105 (e.g., the relevant vehicle function) cannot concurrently implement the automated settings of the two actions. In the above example, the first automated vehicle action and the second automated vehicle action may be implemented at the same time because the seat of the first user 120 (e.g., sitting in the driver's seat) has a different seat heating function than the seat of the second user 175 (e.g., sitting in a passenger seat). Thus, in the event the computing system 130 detects an outside temperature of fourteen degrees Celsius, the computing system 130 may transmit a first signal to set the first user's seat heating function to "low" and a second signal to set the second user's seat heating function to "high". In an embodiment, the computing system 130 may generate content to inform the first and second users of the activation of the automated settings (e.g., via a user interface on the display device of the infotainment system).

In the event a conflict exists, the computing system 130 may attempt to resolve the conflict according to one or more policies 375. In an embodiment, the policies 375 may include one or more policies for resolving conflicts between automated vehicle actions of different users that are both in the vehicle 105. For example, a policy 375 may include a hierarchy structure that indicates that the automated vehicle actions for whichever user is the driver are to be given priority over other automated vehicle actions. In another example, the hierarchy structure may indicate that the automated vehicle actions for whichever user first entered the vehicle 105 are to be given priority over other automated vehicle actions. In an embodiment, the computing system 130 may generate content to inform the first user 120 or second user 175 that a particular automated vehicle action is not being implemented in light of the conflict.

The method 1100 in an embodiment may include a step 1115, in which the computing system 130 generates another automated vehicle action for the second user 175 based on context data associated with the second user 175. For instance, the computing system 130 may utilize the data pipeline 300 described with reference to FIG. 3 to generate an automated vehicle action for the second user 175 of the vehicle 105. Such vehicle actions may be stored in association with the second user profile of the second user 175. In this way, a user/user profile may be associated with a plurality of automated vehicle actions, where at least one automated vehicle action (e.g., the command instructions associated therewith) was determined by a first vehicle 105 and at least one automated vehicle action (e.g., the command instructions associated therewith) was determined by a second vehicle 175.

In some implementations, the computing system 130 may utilize the data pipeline 300 to concurrently learn the routines and patterns of a first user 120 and a second user 175. This may include collecting context data, generating user-activity clusters, determining automated vehicle actions, outputting command instructions, performing deconfliction analysis, etc. for the first user 120 and the second user 175 at the same time.

Figure 12:
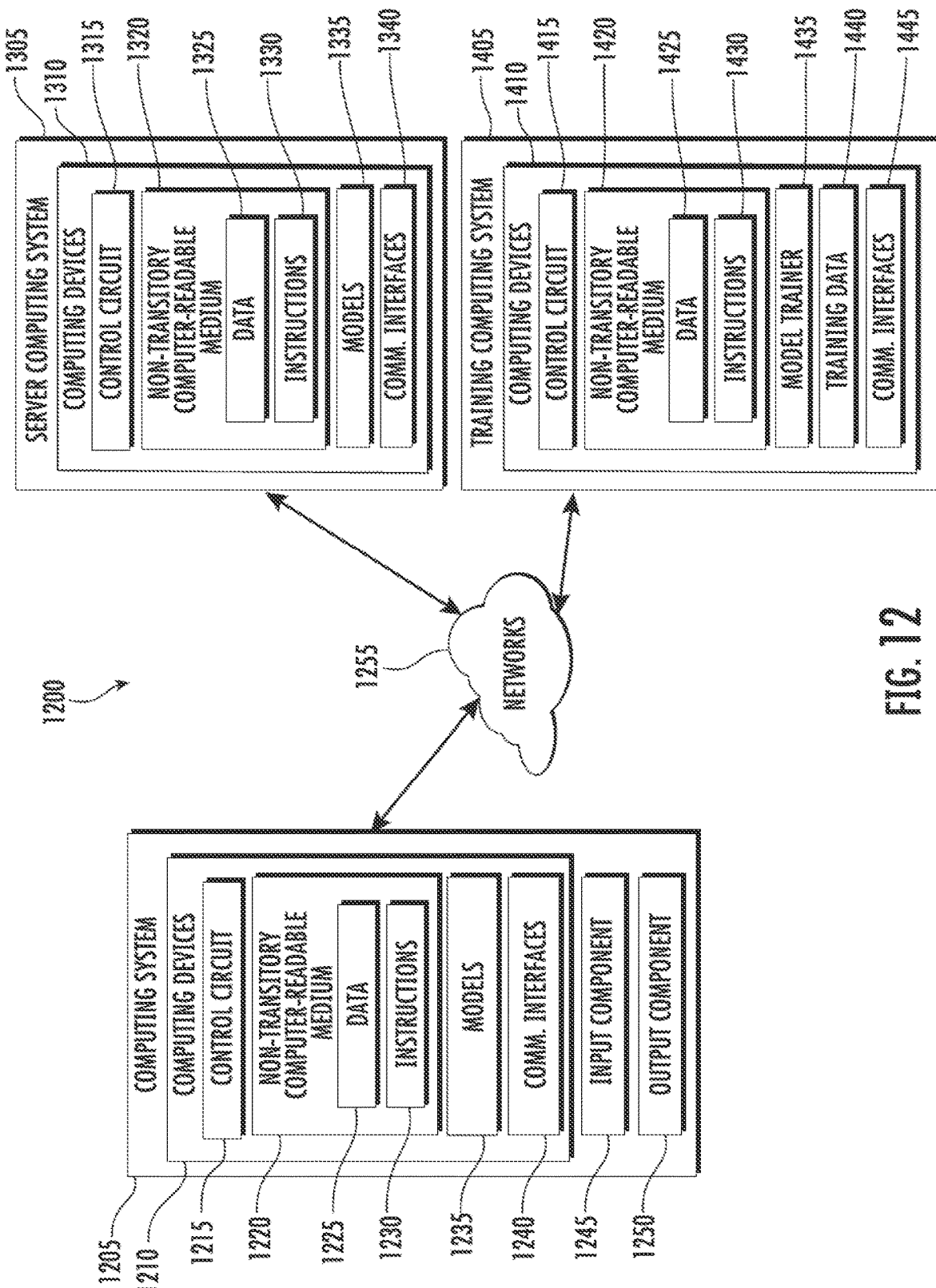
FIG. 12 illustrates a block diagram of an example computing system according to an embodiment hereof.

FIG. 12 illustrates a block diagram of an example computing system 1200 according to an embodiment hereof. The system 1200 includes a computing system 1205 (e.g., a computing system onboard a vehicle), a server computing system 1305 (e.g., a remote computing system, cloud computing platform), and a training computing system 1405 that are communicatively coupled over one or more networks 1255.

The computing system 1205 may include one or more computing devices 1210 or circuitry. For instance, the computing system 1205 may include a control circuit 1215 and a non-transitory computer-readable medium 1220, also referred to herein as memory. In an embodiment, the control circuit 1215 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 1215 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 1215 may be programmed by one or more computer-readable or computer-executable instructions stored on the non-transitory computer-readable medium 1220.

In an embodiment, the non-transitory computer-readable medium 1220 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 1220 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 1220 may store information that may be accessed by the control circuit 1215. For instance, the non-transitory computer-readable medium 1220 (e.g., memory devices) may store data 1225 that may be obtained, received, accessed, written, manipulated, created, and/or stored. The data 1225 may include, for instance, any of the data or information described herein. In some implementations, the computing system 1205 may obtain data from one or more memories that are remote from the computing system 1205.

The non-transitory computer-readable medium 1220 may also store computer-readable instructions 1230 that may be executed by the control circuit 1215. The instructions 1230 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1215 to perform one or more functional tasks. The modules and computer-readable/executable instructions may be described as performing various operations or tasks when the control circuit 1215 or other hardware component is executing the modules or computer-readable instructions.

The instructions 1230 may be executed in logically and/or virtually separate threads on the control circuit 1215. For example, the non-transitory computer-readable medium 1220 may store instructions 1230 that when executed by the control circuit 1215 cause the control circuit 1215 to perform any of the operations, methods and/or processes described herein. In some cases, the non-transitory computer-readable medium 1220 may store computer-executable instructions or computer-readable instructions, such as instructions to perform at least a portion of the methods of FIG. 10A-B or 11.

In an embodiment, the computing system 1205 may store or include one or more machine-learned models 1235. For example, the machine-learned models 1235 may be or may otherwise include various machine-learned models, including the machine-learned clustering model 320. In an embodiment, the machine-learned models 1235 may include an unsupervised learning model (e.g., for generating data clusters). In an embodiment, the machine-learned models 1235 may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

In an aspect of the present disclosure, the models 1235 may be used to group a variety of types of input data. For example, the machine-learned clustering model 320 may be used to categorize, recognize patterns, or extract features from input data such as data encoding user interactions with a vehicle function 165A-C, which describe a user-selected setting 310 and the observed conditions 315 associated therewith, or any other suitable type of structured data.

As described herein, the machine-learned clustering model 320 may receive an input and process each input to produce a respective cluster assignment for each input. The respective cluster assignment for each input may include a respective probability distribution for the respective embedding with respect to a plurality of clusters. Each probability distribution for a respective input element may describe respective probabilities (e.g., confidences) for the respective element belonging in each of the clusters. In other words, the respective cluster assignment may probabilistically map (e.g., soft-encode) each input to the plurality of clusters. As such, the cluster assignments may identify similarities between various inputs or input elements, such as similar objects or features within images, similar sounds within audio, and/or correlations between statistical data points.

In some implementations, the cluster assignments that describe the mapping of the embedding with respect to the plurality of clusters may describe respective centroids of the plurality of clusters. For example, the clusters may be mathematically defined based on their respective centroids in a multi-dimensional space. In other implementations, the cluster assignments that describe the mapping of the embedding with respect to the plurality of clusters do not refer to or require computation of cluster centroids.

In an embodiment, the one or more machine-learned models 1235 may be received from the server computing system 1305 over networks 1255, stored in the computing system 1205 (e.g., non-transitory computer-readable medium 1220), and then used or otherwise implemented by the control circuit 1215. In an embodiment, the computing system 1205 may implement multiple parallel instances of a single model.

Additionally, or alternatively, one or more machine-learned models 1235 may be included in or otherwise stored and implemented by the server computing system 1305 that communicates with the computing system 1205 according to a client-server relationship. For example, the machine-learned models 1235 may be implemented by the server computing system 1305 as a portion of a web service. Thus, one or more models 1235 may be stored and implemented at the computing system 1205 and/or one or more models 1235 may be stored and implemented at the server computing system 1305.

The computing system 1205 may include one or more communication interfaces 1240. The communication interfaces 1240 may be used to communicate with one or more other systems. The communication interfaces 1240 may include any circuits, components, software, etc. for communicating via one or more networks (e.g., networks 1255). In some implementations, the communication interfaces 1240 may include for example, one or more of a communications controller, receiver, transceiver, transmitter, port, conductors, software and/or hardware for communicating data/information.

The computing system 1205 may also include one or more user input components 1245 that receives user input. For example, the user input component 1245 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 1205 may include one or more output components 1250. The output components 1250 may include hardware and/or software for audibly or visually producing content. For instance, the output components 1250 may include one or more speakers, earpieces, headsets, handsets, etc. The output components 1250 may include a display device, which may include hardware for displaying a user interface and/or messages for a user. By way of example, the output component 1250 may include a display screen, CRT, LCD, plasma screen, touch screen, TV, projector, tablet, and/or other suitable display components.

The server computing system 1305 may include one or more computing devices 1310. In an embodiment, the server computing system 1305 may include or is otherwise implemented by one or more server computing devices. In instances in which the server computing system 1305 includes plural server computing devices, such server computing devices may operate according to sequential computing architectures, parallel computing architectures, or some combination thereof.

The server computing system 1305 may include a control circuit 1315 and a non-transitory computer-readable medium 1320, also referred to herein as memory 1320. In an embodiment, the control circuit 1315 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 1315 may be programmed by one or more computer-readable or computer-executable instructions stored on the non-transitory computer-readable medium 1320.

In an embodiment, the non-transitory computer-readable medium 1320 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 1320 may store information that may be accessed by the control circuit 1315. For instance, the non-transitory computer-readable medium 1320 (e.g., memory devices) may store data 1325 that may be obtained, received, accessed, written, manipulated, created, and/or stored. The data 1325 may include, for instance, any of the data or information described herein. In some implementations, the server system 1305 may obtain data from one or more memories that are remote from the server system 1305.

The non-transitory computer-readable medium 1320 may also store computer-readable instructions 1330 that may be executed by the control circuit 1315. The instructions 1330 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1315 to perform one or more functional tasks. The modules and computer-readable/executable instructions may be described as performing various operations or tasks when the control circuit 1315 or other hardware component is executing the modules or computer-readable instructions.

The instructions 1330 may be executed in logically and/or virtually separate threads on the control circuit 1315. For example, the non-transitory computer-readable medium 1320 may store instructions 1330 that when executed by the control circuit 1315 cause the control circuit 1315 to perform any of the operations, methods and/or processes described herein. In some cases, the non-transitory computer-readable medium 1320 may store computer-executable instructions or computer-readable instructions, such as instructions to perform at least a portion of the methods of FIG. 10A-B or 11.

The server computing system 1305 may store or otherwise include one or more machine-learned models 1335, including a plurality of machine-learned clustering models 320. The machine-learned models 1335 may include or be the same as the models 1235 stored in computing system 1205. In an embodiment, the machine-learned models 1335 may include an unsupervised learning model (e.g., for generating data clusters). In an embodiment, the machine-learned models 1335 may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

The machine-learned models described in this specification may have various types of input data and/or combinations thereof, representing data available to sensors and/or other systems onboard a vehicle. Input data may include, for example, latent encoding data (e.g., a latent space representation of an input, etc.), statistical data (e.g., data computed and/or calculated from some other data source), sensor data (e.g., raw and/or processed data captured by a sensor of the vehicle), or other types of data.

The server computing system 1305 may include one or more communication interfaces 1340. The communication interfaces 1340 may be used to communicate with one or more other systems. The communication interfaces 1340 may include any circuits, components, software, etc. for communicating via one or more networks (e.g., networks 1255). In some implementations, the communication interfaces 1340 may include for example, one or more of a communications controller, receiver, transceiver, transmitter, port, conductors, software and/or hardware for communicating data/information.

The computing system 1205 and/or the server computing system 1305 may train the models 1235, 1335 via interaction with the training computing system 1405 that is communicatively coupled over the networks 1255. The training computing system 1405 may be separate from the server computing system 1305 or may be a portion of the server computing system 1305.

The training computing system 1405 may include one or more computing devices 1410. In an embodiment, the training computing system 1405 may include or is otherwise implemented by one or more server computing devices. In instances in which the training computing system 1405 includes plural server computing devices, such server computing devices may operate according to sequential computing architectures, parallel computing architectures, or some combination thereof.

The training computing system 1405 may include a control circuit 1415 and a non-transitory computer-readable medium 1420, also referred to herein as memory 1420. In an embodiment, the control circuit 1415 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 1415 may be programmed by one or more computer-readable or computer-executable instructions stored on the non-transitory computer-readable medium 1420.

In an embodiment, the non-transitory computer-readable medium 1420 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 1420 may store information that may be accessed by the control circuit 1415. For instance, the non-transitory computer-readable medium 1420 (e.g., memory devices) may store data 1425 that may be obtained, received, accessed, written, manipulated, created, and/or stored. The data 1425 may include, for instance, any of the data or information described herein. In some implementations, the training computing system 1405 may obtain data from one or more memories that are remote from the training computing system 1405.

The non-transitory computer-readable medium 1420 may also store computer-readable instructions 1430 that may be executed by the control circuit 1415. The instructions 1430 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1415 to perform one or more functional tasks. The modules and computer-readable/executable instructions may be described as performing various operations or tasks when the control circuit 1415 or other hardware component is executing the modules or computer-readable instructions.

The instructions 1430 may be executed in logically or virtually separate threads on the control circuit 1415. For example, the non-transitory computer-readable medium 1420 may store instructions 1430 that when executed by the control circuit 1415 cause the control circuit 1415 to perform any of the operations, methods and/or processes described herein. In some cases, the non-transitory computer-readable medium 1420 may store computer-executable instructions or computer-readable instructions, such as instructions to perform at least a portion of the methods of FIG. 10A-B or 11.

The training computing system 1405 may include a model trainer 1435 that trains the machine-learned models 1235, 1335 stored at the computing system 1205 and/or the server computing system 1305 using various training or learning techniques. For example, the models 1235, 1335 (e.g., a machine-learned clustering model) may be trained using a clustering loss function. The clustering loss function may be configured to balance two competing objectives. First, the clustering loss function may be configured to seek to produce confident assignments of input data elements to clusters. The clustering loss function may balance this first objective with a second objective that prevents a trivial solution, in which all elements of the input data are mapped to a single cluster. Thus, the clustering loss function may encourage each input to be confidently assigned to one of the clusters, but also encourage mapping of the input data points across multiple clusters.

The model trainer may train the models 1235, 1335 (e.g., a machine-learned clustering model) in an unsupervised fashion. As such, the models may be effectively trained using unlabeled data for particular applications or problem domains (e.g., generating user-activity clusters), which improves performance and adaptability of the models. Furthermore, the models 1235, 1335 may facilitate the discovery of natural partitions or clusters in the data without requiring a pre-existing embedding to seed the clustering objective. As a result, such models may be more effectively trained to cluster complex data with less manual human intervention (e.g., labeling, selecting a pre-existing embedding, etc.).

More particularly, the clustering loss function may evaluate satisfaction of the first objective (encouraging confident mappings) by evaluating a first average, across the plurality of inputs, of a respective first entropy of each respective probability distribution (e.g., a "mean per-example entropy"). The clustering loss function may evaluate satisfaction of the second objective (encouraging diversity of cluster assignments) by evaluating a second entropy of a second average of the probability distributions for the plurality of inputs (e.g., an "entropy of a batch average distribution"). Thus, the clustering loss function may be used to train the models 1235, 1335 to produce non-trivial and confident clustering assignments in an unsupervised fashion.

The training computing system 1405 may modify parameters of the models 1235, 1335 (e.g., the machine-learned clustering model 320) based on the loss function (e.g., clustering loss function) such that the models 1235, 1335 may be effectively trained for specific applications in an unsupervised manner without labeled data. This may be particularly useful for effectively training a model to cluster complex, unlabeled data sets.

In an example, the model trainer 1435 may backpropagate the clustering loss function through the machine-learned clustering model 320 to modify the parameters (e.g., weights) of the clustering model. The model trainer 1435 may continue to backpropagate the clustering loss function through the machine-learned clustering model 320, with or without modification of the parameters (e.g., weights) of the model. For instance, the model trainer 1435 may perform a gradient descent technique in which parameters of the machine-learned clustering model 320 may be modified in a direction of a negative gradient of the clustering loss function. Thus, in an embodiment, the model trainer 1435 may modify parameters of the machine-learned clustering model 320 based on the clustering loss function without modifying parameters of the embedding model.

In an embodiment, one or more components of the clustering loss function may be scaled by respective hyperparameters. For example, the second entropy may be scaled by a diversity hyperparameter. The diversity hyperparameter may be used to adjust the relative effects of the clustering loss function terms that respectively promote the two objectives. As such, the diversity hyperparameter may be used to adjust or tune the loss provided by the clustering loss function and the resulting behavior of the machine-learned clustering model 320 trained based on the clustering loss function. The diversity hyperparameter may be selected to produce the desired balance between the first objective of minimizing the average entropy of the input data points and the second objective of preventing collapse of the mapping produced by the machine-learned clustering model 320 into the trivial solution in which all inputs are mapped to a single cluster.

In other implementations, one or more components of the clustering loss function may be scaled by a learned diversity weight or parameter. For example, iterative steps of training and evaluating may be used to optimize the diversity hyperparameter that controls a balance between the first and second objectives described above. Thus, the diversity weight may be learned to further improve training of the machine-learned clustering model 320.

The model trainer 1435 may utilize training techniques, such as backwards propagation of errors. For example, a loss function may be backpropagated through a model to update one or more parameters of the models (e.g., based on a gradient of the loss function). Various loss functions may be used such as mean squared error, likelihood loss, cross entropy loss, hinge loss, and/or various other loss functions. Gradient descent techniques may be used to iteratively update the parameters over a number of training iterations.

In an embodiment, performing backwards propagation of errors may include performing truncated backpropagation through time. The model trainer 1435 may perform a number of generalization techniques (e.g., weight decays, dropouts, etc.) to improve the generalization capability of a model being trained. In particular, the model trainer 1435 may train the machine-learned models 1235, 1335 based on a set of training data 1440.

The training data 1440 may include unlabeled training data for training in an unsupervised fashion. In an example, the training data 1440 may include unlabeled sets of data indicative of training user-selected settings and data indicative of training observed conditions, for a particular vehicle function. The training data 1440 may be specific to a particular vehicle function to help focus the models 1235, 1335 on the particular vehicle function.

In an embodiment, if the user has provided consent/authorization, training examples may be provided by the computing system 1205 (e.g., of the user's vehicle). Thus, in such implementations, a model 1235 provided to the computing system 1205 may be trained by the training computing system 1405 in a manner to personalize the model 1235.

The model trainer 1435 may include computer logic utilized to provide desired functionality. The model trainer 1435 may be implemented in hardware, firmware, and/or software controlling a general-purpose processor. For example, in an embodiment, the model trainer 1435 may include program files stored on a storage device, loaded into a memory and executed by one or more processors. In other implementations, the model trainer 1435 may include one or more sets of computer-executable instructions that are stored in a tangible computer-readable storage medium such as RAM, hard disk, or optical or magnetic media.

The training computing system 1405 may include one or more communication interfaces 1445. The communication interfaces 1445 may be used to communicate with one or more other systems. The communication interfaces 1445 may include any circuits, components, software, etc. for communicating via one or more networks (e.g., networks 1255). In some implementations, the communication interfaces 1445 may include for example, one or more of a communications controller, receiver, transceiver, transmitter, port, conductors, software and/or hardware for communicating data/information.

The one or more networks 1255 may be any type of communications network, such as a local area network (e.g., intranet), wide area network (e.g., Internet), or some combination thereof and may include any number of wired or wireless links. In general, communication over a network 1255 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 15 illustrates one example computing system that may be used to implement the present disclosure. Other computing systems may be used as well. For example, in an embodiment, the computing system 1205 may include the model trainer 1435 and the training dataset 1440. In such implementations, the models 1235, 1335 may be both trained and used locally at the computing system 1205. In some of such implementations, the computing system 1205 may implement the model trainer 1435 to personalize the models 1235, 1335.

Additional Discussion of Various Embodiments

Embodiment 1 relates to a computing system. The computing system may include a control circuit. The control circuit may be configured to receive context data associated with a plurality of user interactions with a vehicle function of a vehicle over a plurality of instances in time. The context data may include data indicative of a plurality of user-selected settings for the vehicle function and data indicative of one or more observed conditions associated with the respective user-selected settings. The control circuit may be configured to generate, using a machine-learned clustering model, a user-activity cluster for the vehicle function based on the context data. The machine-learned clustering model may be configured to identify the user-activity cluster based on at least a portion of the user-selected settings and at least a portion of the one or more observed conditions associated with the respective user-selected settings. The control circuit may be configured to determine an automated vehicle action based on the user-activity cluster. The automated vehicle action may be indicative of an automated setting for the vehicle function and one or more triggering conditions for automatically implementing the automated setting. The control circuit may output command instructions for the vehicle to implement the automated vehicle action for automatically controlling the vehicle function in accordance with the automated setting based on whether the vehicle detects the one or more triggering conditions.

Embodiment 2 includes the computing system of Embodiment 1. In this embodiment, the machine-learned clustering model may be an unsupervised learning model configured to process the context data using probabilistic clustering to generate the user-activity cluster.

Embodiment 3 includes the computing system of any of embodiments 1 or 2. In this embodiment, the machine-learned clustering model may be configured to determine the boundaries of the user-activity cluster for the vehicle function based on the one or more observed conditions.

Embodiment 4 includes the computing system of any of embodiments 1-3. In this embodiment, to determine the automated vehicle action, the control circuit may be configured to process the user-activity cluster using a vehicle action model, wherein the vehicle action model is a rules-based model configured to apply a respective weight to each of the respective user-selected settings within the user-activity cluster. The control circuit may be configured to determine the automated setting for the vehicle function, based on the weights of the respective user-selected settings within the user-activity cluster.

Embodiment 5 includes the computing system of any of embodiments 1-4. In this embodiment, to receive the context data, the control circuit may be further configured to receive, via a plurality of sensors or systems of the vehicle, data indicative of the one or more observed conditions. The observed conditions may include at least one of: (i) a day and/or a time of day at which the respective user interaction with the vehicle function occurred, (ii) a location at which the respective user interaction with the vehicle function occurred, (iii) a route during which the respective user interaction with the vehicle function occurred, or (iv) a temperature when the respective user interaction with the vehicle function occurred.

Embodiment 6 includes the computing system of any of embodiments 1-5. In this embodiment, the control circuit is further configured to generate, based on the automated vehicle action and using an action explanation model, content for presentation to a user via a user interface of a display device. The content indicates the vehicle function, the automated setting, and the one or more triggering conditions.

Embodiment 7 includes the computing system of any of embodiments 1-6. In this embodiment, the content may include a request for the user to approve the automated vehicle action.

Embodiment 8 includes the computing system of any of embodiments 1-7. In this embodiment, the control circuit may be further configured to store the command instructions in an accessible memory on the vehicle for execution at a subsequent time.

Embodiment 9 includes the computing system of any of embodiments 1-8. In this embodiment, the control circuit may be further configured to detect an occurrence of the one or more triggering conditions and based on the one or more triggering conditions, transmit a signal to implement the automated setting for the vehicle function.

Embodiment 10 includes the computing system of any of embodiments 1-9. In this embodiment, the control circuit may be further configured to determine whether a conflict between the automated vehicle action and a pre-existing automated vehicle action exists or does not exist.

Embodiment 11 includes the computing system of any of embodiments 1-10. In this embodiment, the control circuit may be further configured to transmit, over a network to a server system, a communication indicative of the command instructions for storage in association with a user profile of a user.

Embodiment 12 includes the computing system of any of embodiments 1-11. In this embodiment, the plurality of user interactions may be associated with a first user. The command instructions for the automated vehicle action may be associated with a first user profile of the first user. The control circuit may be further configured to receive data indicative of a second user profile of a second user of the vehicle; and store, in an accessible memory of the vehicle, command instructions for a second automated vehicle action associated with the second user profile. The command instructions for the second automated vehicle action may be based on at least one user interaction of the second user with a vehicle function of another vehicle.

Embodiment 13 includes the computing system of any of embodiments 1-12. In this embodiment, the vehicle may include a plurality of vehicle functions and a plurality of machine-learned clustering models. The control circuit may be further configured to select the machine-learned clustering model from among the plurality of machine-learned clustering models based on the vehicle function.

Embodiment 14 includes the computing system of any of embodiments 1-13. In this embodiment, the vehicle function may include: (i) a window function, (ii) a seat function, or (iii) a temperature function.

Embodiment 15 includes the computing system of any of embodiments 1-14. In this embodiment, the seat function may include: a seat temperature function, a seat ventilation function, or a seat massage function.

Embodiment 16 includes the computing system of any of embodiments 1-15. In this embodiment, the plurality of user-selected settings of the vehicle function may respectively include at least one of: (i) an on/off selection, (ii) an open/close selection, (iii) a temperature selection, or (iv) a massage level selection.

Embodiment 17 includes a computer-implemented method. The computer-implemented method may include receiving context data associated with a plurality of user interactions with a vehicle function of a vehicle over a plurality of instances in time. The context data may include data indicative of a plurality of user-selected settings for the vehicle function and data indicative of one or more observed conditions associated with the respective user-selected settings. The computer-implemented method may include generating, using a machine-learned clustering model, a user-activity cluster for the vehicle function based on the context data. The machine-learned clustering model may be configured to identify the user-activity cluster based on at least a portion of the user-selected settings and at least a portion of the one or more observed conditions associated with the respective user-selected settings. The computer-implemented method may include determining an automated vehicle action based on the user-activity cluster. The automated vehicle action may be indicative of an automated setting for the vehicle function and one or more triggering conditions for automatically implementing the automated setting. The computer-implemented method may include outputting command instructions for the vehicle to implement the automated vehicle action for automatically controlling the vehicle function in accordance with the automated setting based on whether the vehicle detects the one or more triggering conditions.

Embodiment 18 includes the computer-implemented method of embodiment 17. In this embodiment, the machine-learned clustering model may include an unsupervised learning model configured to process the context data using probabilistic clustering to generate the user-activity cluster, and the boundaries of the user-activity cluster for the vehicle function may be based on the one or more observed conditions.

Embodiment 19 includes the computer-implemented method of any of embodiments 17 or 18. In this embodiment, the computer-implemented method may further include generating, based on the automated vehicle action and using an action explanation model, content for presentation to a user via a user interface of a display device. The content may indicate the vehicle function, the automated setting, and the one or more triggering conditions.

Embodiment 20 includes one or more non-transitory computer-readable media that store instructions that are executable by a control circuit to perform operations. The control circuit may receive context data associated with a plurality of user interactions with a vehicle function of a vehicle over a plurality of instances in time. The context data may include data indicative of a plurality of user-selected settings for the vehicle function and data indicative of one or more observed conditions associated with the respective user-selected settings. The control circuit may generate, using a machine-learned clustering model, a user-activity cluster for the vehicle function based on the context data. The machine-learned clustering model may be configured to identify the user-activity cluster based on at least a portion of the user-selected settings and at least a portion of the one or more observed conditions associated with the respective user-selected settings. The control circuit may determine an automated vehicle action based on the user-activity cluster. The automated vehicle action may be indicative of an automated setting for the vehicle function and one or more triggering conditions for automatically implementing the automated setting. The control circuit may output command instructions for the vehicle to implement the automated vehicle action for automatically controlling the vehicle function in accordance with the automated setting based on whether the vehicle detects the one or more triggering conditions.

Additional Disclosure

As used herein, adjectives and their possessive forms are intended to be used interchangeably unless apparent otherwise from the context and/or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment may be used with another embodiment to yield a still further embodiment. Thus, it is intended that the present disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . , (i), (ii), (iii), . . . , etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

What is claimed is:

1. A computing system comprising:
a control circuit configured to:
receive context data associated with a plurality of user interactions with a vehicle function, of a plurality of different vehicle functions, of a vehicle over a plurality of instances in time, wherein the context data comprises data indicative of a plurality of user-selected settings for the vehicle function and data indicative of one or more observed conditions associated with the respective user-selected settings;
generate, using a machine-learned clustering model selected from a plurality of machine-learned clustering models, a user-activity cluster for the vehicle function based on the context data, the machine-learned clustering model being configured to identify the user-activity cluster based on at least a portion of the user-selected settings and at least a portion of the one or more observed conditions associated with the respective user-selected settings
wherein each respective machine-learned clustering model of the plurality of machine-learned clustering models is associated with a different vehicle function of the plurality of different vehicle functions and wherein the machine-learned clustering model is selected based on the vehicle function;
determine an automated vehicle action based on the user-activity cluster, wherein the automated vehicle action is indicative of an automated setting for the vehicle function and one or more triggering conditions for automatically implementing the automated setting; and
output command instructions for the vehicle to implement the automated vehicle action for automatically controlling the vehicle function in accordance with the automated setting based on whether the vehicle detects the one or more triggering conditions.

2. The computing system of claim 1, wherein the machine-learned clustering model is an unsupervised learning model configured to process the context data using probabilistic clustering to generate the user-activity cluster.

3. The computing system of claim 1, wherein the machine-learned clustering model is configured to determine the boundaries of the user-activity cluster for the vehicle function based on the one or more observed conditions.

4. The computing system of claim 1, wherein to determine the automated vehicle action, the control circuit is configured to:
process the user-activity cluster using a vehicle action model, wherein the vehicle action model is a rules-based model configured to apply a respective weight to each of the respective user-selected settings within the user-activity cluster; and
determine the automated setting for the vehicle function, based on the weights of the respective user-selected settings within the user-activity cluster.

5. The computing system of claim 1, wherein to receive the context data, the control circuit is further configured to:

receive, via a plurality of sensors or systems of the vehicle, data indicative of the one or more observed conditions, wherein the observed conditions comprise at least one of: (i) a day and/or a time of day at which the respective user interaction with the vehicle function occurred, (ii) a location at which the respective user interaction with the vehicle function occurred, (iii) a route during which the respective user interaction with the vehicle function occurred, or (iv) a temperature when the respective user interaction with the vehicle function occurred.

6. The computing system of claim 1, wherein the control circuit is further configured to:
generate, based on the automated vehicle action and using an action explanation model, content for presentation to a user via a user interface of a display device,
wherein the content indicates the vehicle function, the automated setting, and the one or more triggering conditions.

7. The computing system of claim 6, wherein the content comprises a request for the user to approve the automated vehicle action.

8. The computing system of claim 1, wherein the control circuit is further configured to:
store the command instructions in an accessible memory on the vehicle for execution at a subsequent time.

9. The computing system of claim 1, wherein the control circuit is further configured to:
detect an occurrence of the one or more triggering conditions; and
based on the one or more triggering conditions, transmit a signal to implement the automated setting for the vehicle function.

10. The computing system of claim 1, wherein the control circuit is further configured to:
determine whether a conflict between the automated vehicle action and a pre-existing automated vehicle action exists or does not exist.

11. The computing system of claim 1, wherein the control circuit is further configured to:
transmit, over a network to a server system, a communication indicative of the command instructions for storage in association with a user profile of a user.

12. The computing system of claim 1, wherein the plurality of user interactions are associated with a first user, wherein the command instructions for the automated vehicle action are associated with a first user profile of the first user, and wherein the control circuit is further configured to:
receive data indicative of a second user profile of a second user of the vehicle; and
store, in an accessible memory of the vehicle, command instructions for a second automated vehicle action associated with the second user profile,
wherein the command instructions for the second automated vehicle action are based on at least one user interaction of the second user with a vehicle function of another vehicle.

13. The computing system of claim 1, wherein the vehicle function comprises: (i) a window function, (ii) a seat function, or (iii) a temperature function.

14. The computing system of claim 13, wherein the seat function comprises: a seat temperature function, a seat ventilation function, or a seat massage function.

15. The computing system of claim 1, wherein the plurality of user-selected settings of the vehicle function respectively comprise at least one of: (i) an on/off selection, (ii) an open/close selection, (iii) a temperature selection, or (iv) a massage level selection.

16. A computer-implemented method comprising:
receiving context data associated with a plurality of user interactions with a vehicle function, of a plurality of different vehicle functions of a vehicle over a plurality of instances in time, wherein the context data comprises data indicative of a plurality of user-selected settings for the vehicle function and data indicative of one or more observed conditions associated with the respective user-selected settings;
generating, using a machine-learned clustering model selected from a plurality of machine-learned clustering models, a user-activity cluster for the vehicle function based on the context data, the machine-learned clustering model being configured to identify the user-activity cluster based on at least a portion of the user-selected settings and at least a portion of the one or more observed conditions associated with the respective user-selected settings;
wherein each respective machine-learned clustering model of the plurality of machine-learned clustering models is associated with a different vehicle function of the plurality of different vehicle functions and wherein the machine-learned clustering model is selected based on the vehicle function;
determining an automated vehicle action based on the user-activity cluster, wherein the automated vehicle action is indicative of an automated setting for the vehicle function and one or more triggering conditions for automatically implementing the automated setting; and
outputting command instructions for the vehicle to implement the automated vehicle action for automatically controlling the vehicle function in accordance with the automated setting based on whether the vehicle detects the one or more triggering conditions.

17. The computer-implemented method of claim 16, wherein the machine-learned clustering model is an unsupervised learning model configured to process the context data using probabilistic clustering to generate the user-activity cluster, and wherein the boundaries of the user-activity cluster for the vehicle function are based on the one or more observed conditions.

18. The computer-implemented method of claim 16, further comprising:
generating, based on the automated vehicle action and using an action explanation model, content for presentation to a user via a user interface of a display device,
wherein the content indicates the vehicle function, the automated setting, and the one or more triggering conditions.

19. One or more non-transitory computer-readable media that store instructions that are executable by a control circuit to:
receive context data associated with a plurality of user interactions with a vehicle function, of a plurality of different vehicle functions of a vehicle over a plurality of instances in time, wherein the context data comprises data indicative of a plurality of user-selected settings for the vehicle function and data indicative of one or more observed conditions associated with the respective user-selected settings;
generate, using a machine-learned clustering model selected from a plurality of machine-learned clustering models, a user-activity cluster for the vehicle function based on the context data, the machine-learned clustering model being configured to identify the user-activity cluster based on at least a portion of the user-selected settings and at least a portion of the one or more observed conditions associated with the respective user-selected settings;

wherein each respective machine-learned clustering model of the plurality of machine-learned clustering models is associated with a different vehicle function of the plurality of different vehicle functions and wherein the machine-learned clustering model is selected based on the vehicle function;

determine an automated vehicle action based on the user-activity cluster, wherein the automated vehicle action is indicative of an automated setting for the vehicle function and one or more triggering conditions for automatically implementing the automated setting; and output command instructions for the vehicle to implement the automated vehicle action for automatically controlling the vehicle function in accordance with automated setting based on whether the vehicle detects the one or more triggering conditions.

* * * * *